US008335385B2

(12) United States Patent
Strom et al.

(10) Patent No.: US 8,335,385 B2
(45) Date of Patent: Dec. 18, 2012

(54) PIXEL BLOCK PROCESSING

(75) Inventors: Jacob Strom, Stockholm (SE); Tomas Akenine-Moller, Lund (SE); Per Wennersten, Arsta (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 191 days.

(21) Appl. No.: 12/863,692

(22) PCT Filed: Sep. 17, 2008

(86) PCT No.: PCT/SE2008/051038
§ 371 (c)(1),
(2), (4) Date: Jul. 20, 2010

(87) PCT Pub. No.: WO2009/093947
PCT Pub. Date: Jul. 30, 2009

(65) Prior Publication Data
US 2010/0296745 A1  Nov. 25, 2010

Related U.S. Application Data

(60) Provisional application No. 61/022,397, filed on Jan. 21, 2008, provisional application No. 61/038,452, filed on Mar. 21, 2008, provisional application No. 61/056,232, filed on May 27, 2008.

(30) Foreign Application Priority Data

May 6, 2008   (WO) ................ PCT/EP2008/055520
May 21, 2008  (WO) ................ PCT/EP2008/056288

(51) Int. Cl.
 *G06K 9/36* (2006.01)
(52) U.S. Cl. ....................... 382/232; 382/244
(58) Field of Classification Search .............. 382/232, 382/233, 238, 240, 244, 251
See application file for complete search history.

(56) References Cited

U.S. PATENT DOCUMENTS

| 6,266,449 | B1 | 7/2001 | Ohsawa |
| 2003/0118241 | A1 | 6/2003 | Zandi et al. |
| 2007/0269115 | A1 | 11/2007 | Wang et al. |

FOREIGN PATENT DOCUMENTS

EP  0717555 A2  6/1996

OTHER PUBLICATIONS

Author Unknown. "Technical Introduction to OpenEXR." Nov. 26, 2006, retrieved from the Internet: http://www.openexr.com/TechnicalIntroduction.pdf.
Wanrong, L., et al., "Bit Number Prediction for VLC Coded DCT Coefficients and Its Application in DV Encoding/Transcoding", 2001 IEEE Fourth Workshop, Oct. 3, 2001, pp. 135-140, Piscataway, NJ, USA.
Kondo, T., et al., "New ADRC for Consumer Digital VCR", Sony Corporation, Japan, XP006517160, Jan. 1, 1990, pp. 144-150.
Multimedia Communication Technology, "11 Quantization and Coding", In: OHM J-R: "Multimedia Communication Technology", Springer, XP002492448, Jan. 1, 2004, pp. 445-508.
Panchagnula, R., et al., "Near-Lossless Compression of Digital Terrain Elevation Data", Proceedings of the SPIE, The International Society for Optical Engineering SPIE, USA, vol. 5308, No. 1, Jan. 1, 2004, pp. 331-342, XP-002494140.

*Primary Examiner* — Duy M Dang
(74) *Attorney, Agent, or Firm* — Coats & Bennett, P.L.L.C.

(57) ABSTRACT

A pixel block (300) is losslessly compressed into a candidate compressed block. If the bit length of the candidate block exceeds a threshold value, the property values of the pixels (310-317) in the block (300) are quantized and the quantized values are losslessly compressed into a new candidate compressed block. The procedure is repeated until a candidate compressed block having good image quality and a bit length below the threshold value is found. A compressed representation (400) of the block (300) is determined based on the found candidate compressed block (420) and an identifier (410) of the used quantization parameter.

26 Claims, 12 Drawing Sheets

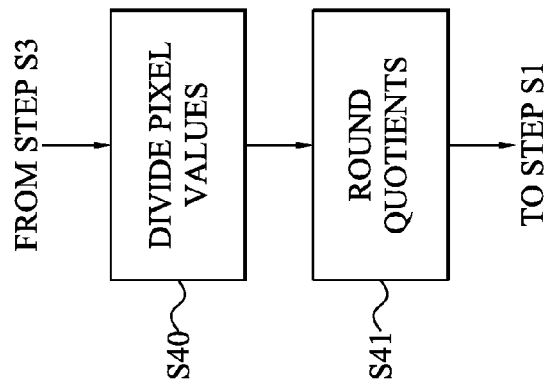
Fig. 6
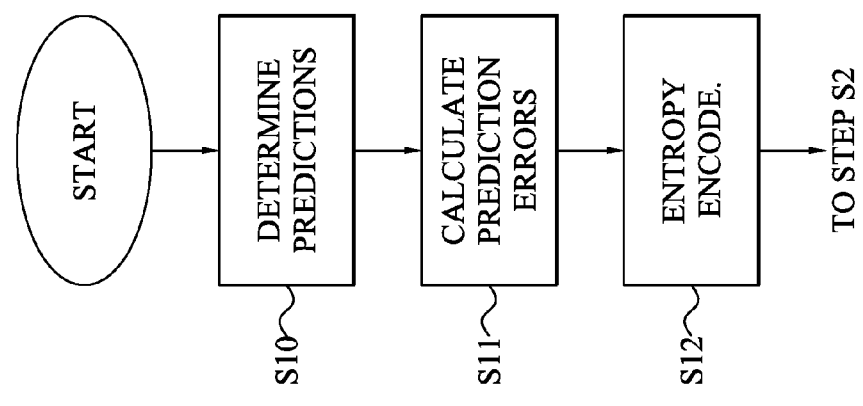
Fig. 3
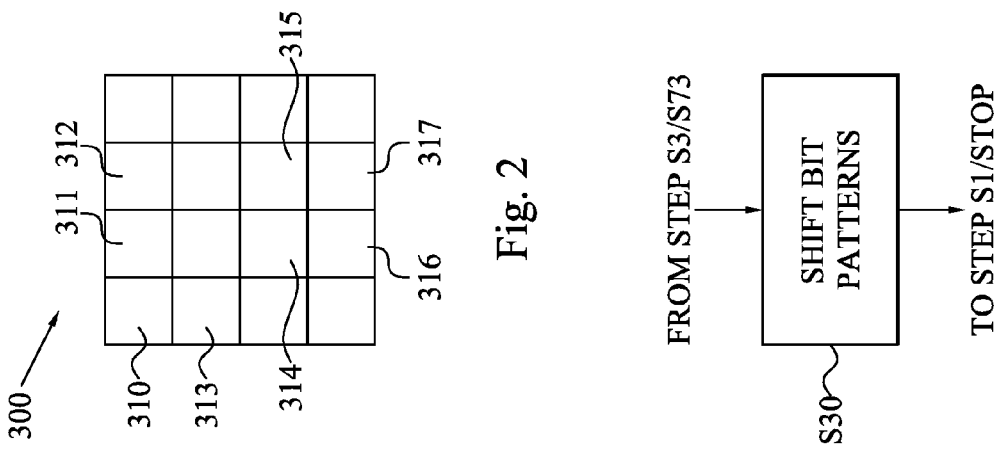
Fig. 2
Fig. 5

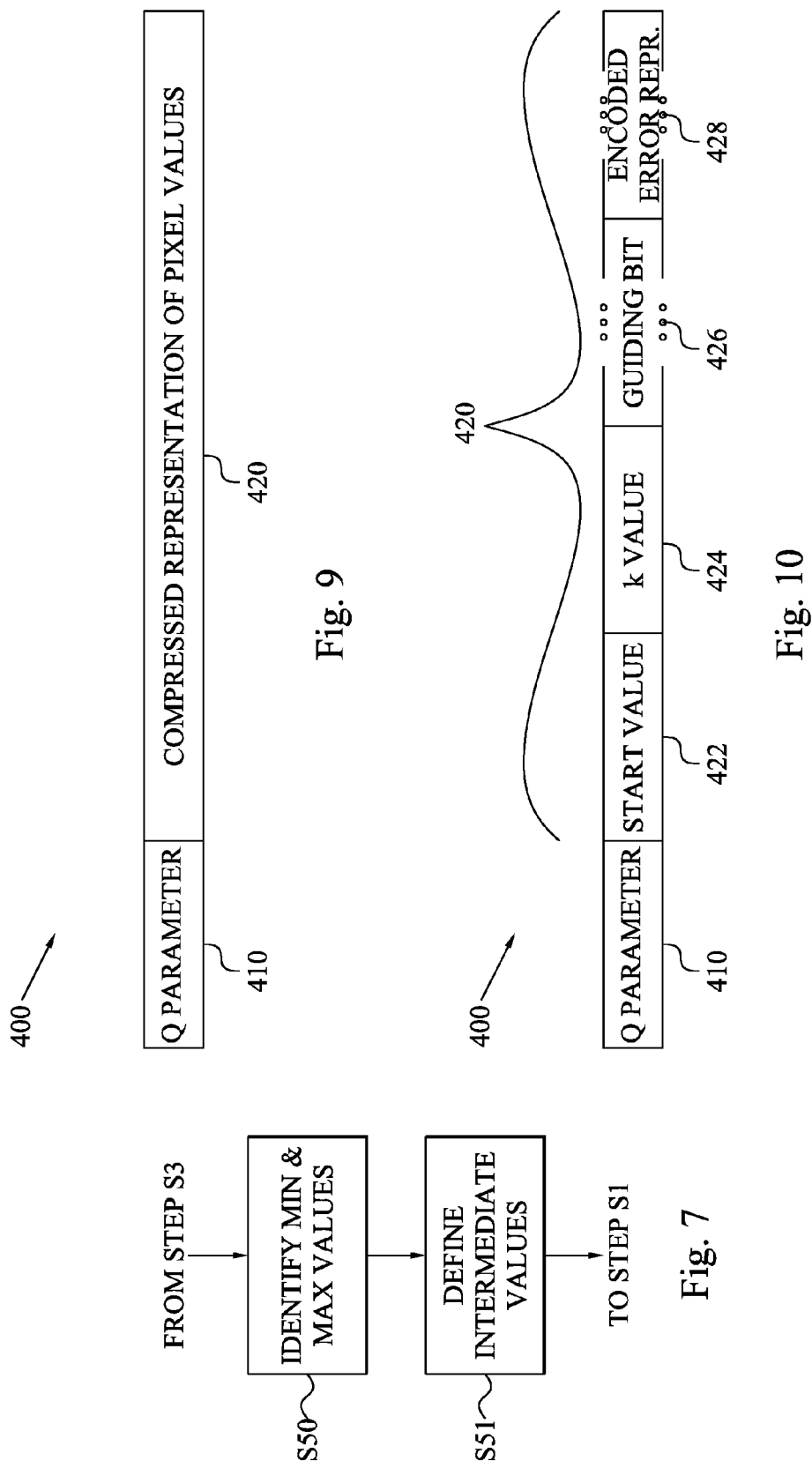

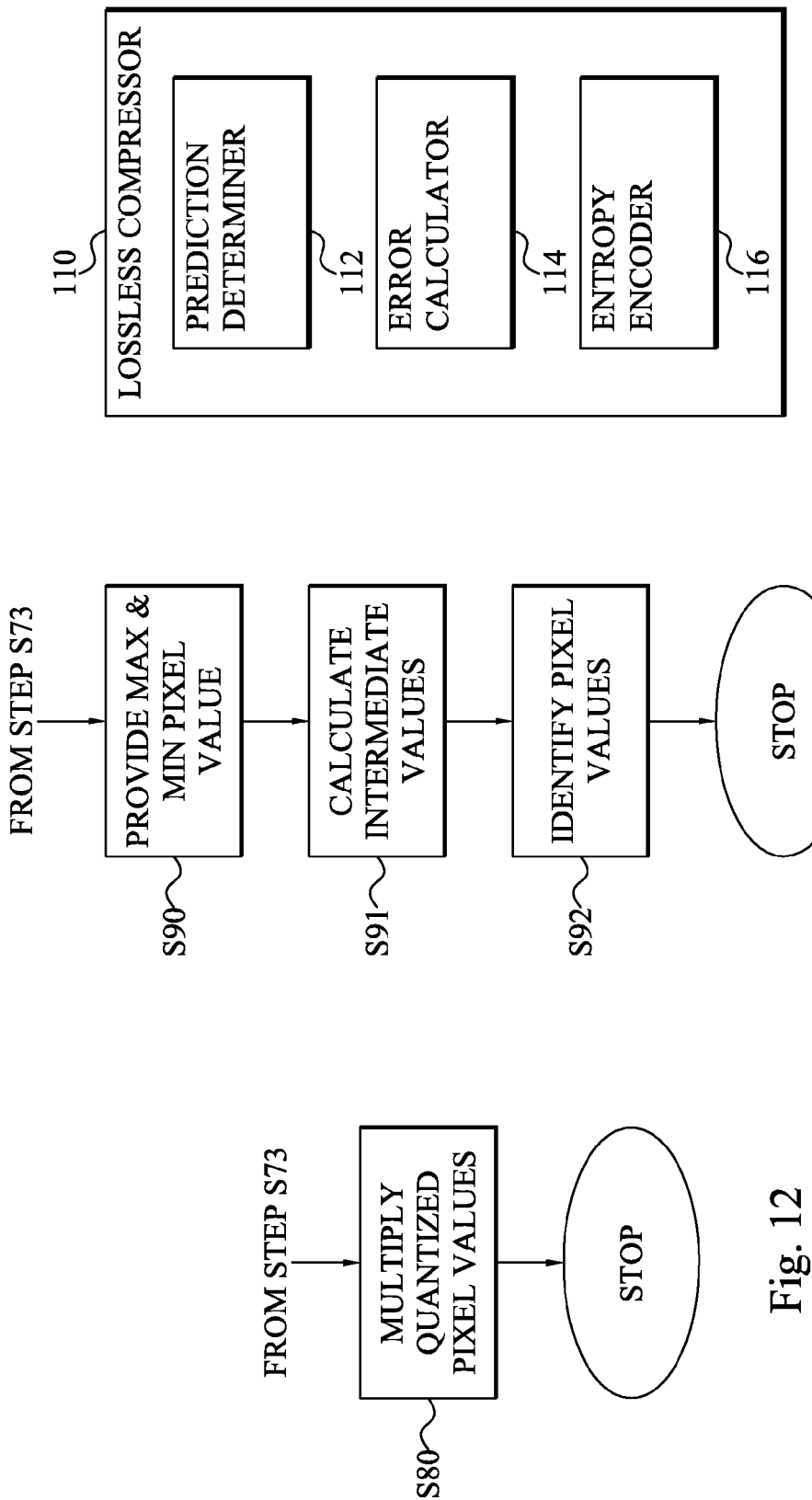

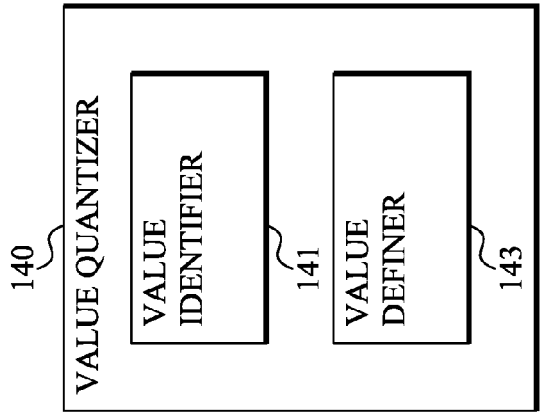
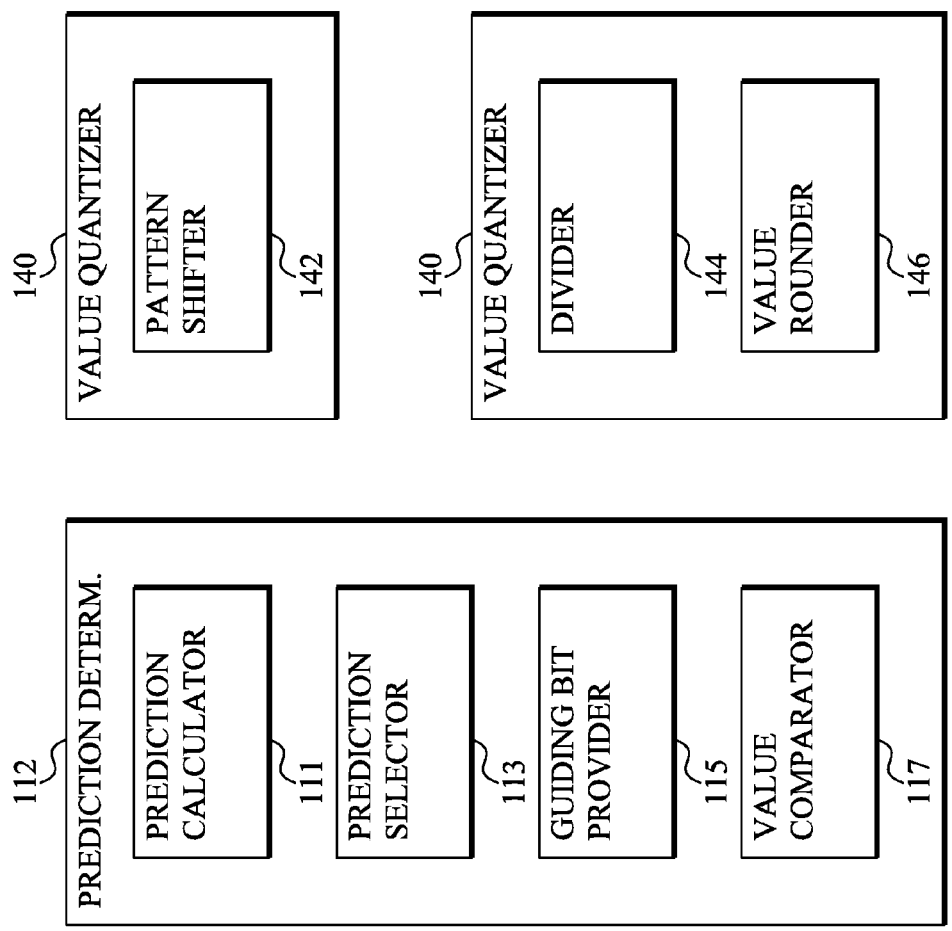

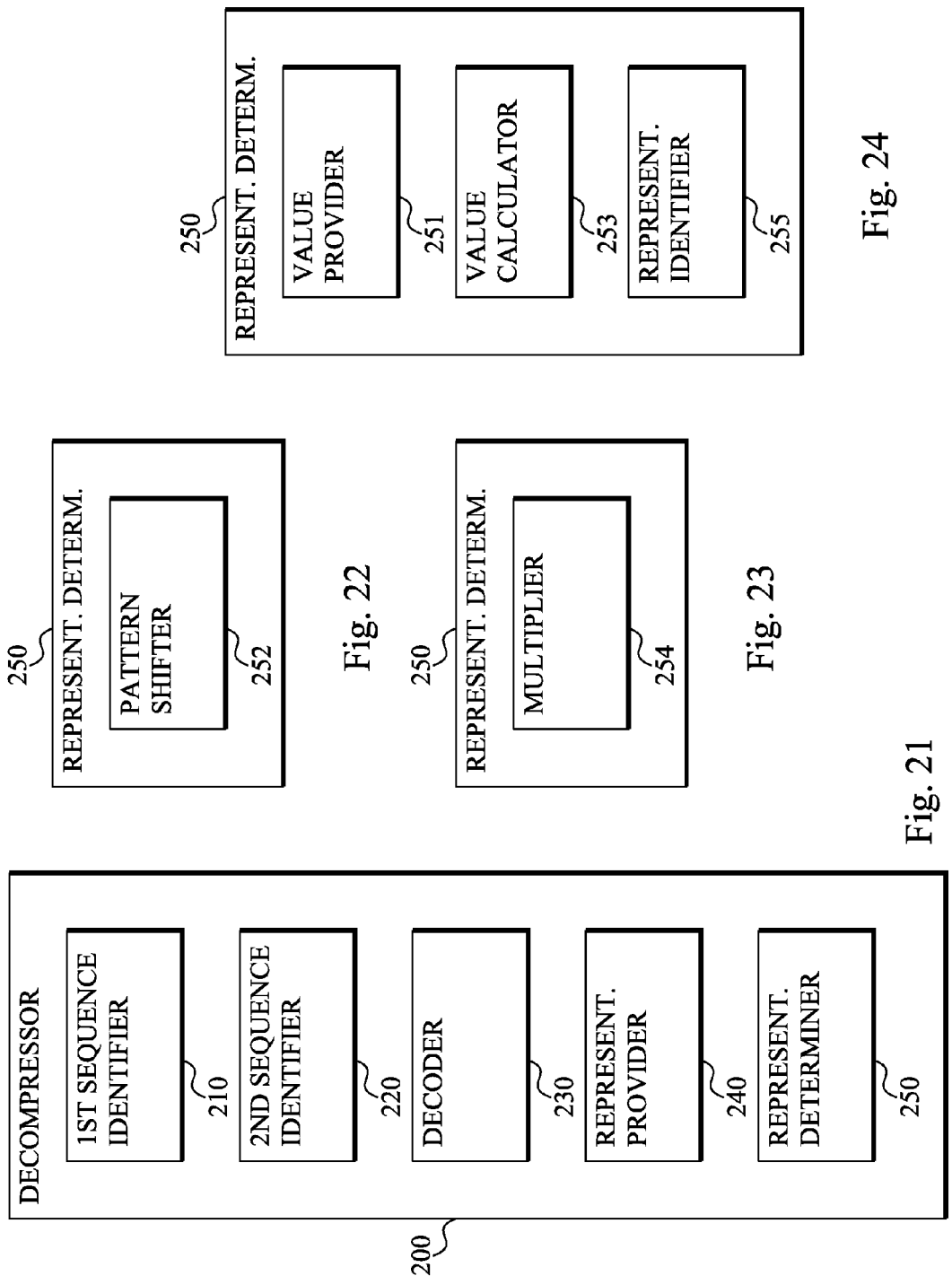

PIXEL BLOCK PROCESSING

TECHNICAL FIELD

The present invention generally relates to pixel block processing, and in particular to compression and decompression of image and texture blocks.

BACKGROUND

In order to increase performance for graphics processing units (GPUs), bandwidth reduction techniques continue to be important. This is especially so, since the yearly performance growth rate for computing capability is much larger than that for bandwidth and latency for dynamic random access memory (DRAM). The effect of this can already be seen in current GPUs, such as the GeForce 8800 architecture from NVIDIA, where there are about 14 scalar operations per texel fetch. Even though algorithms sometimes can be transformed into using more computations instead of memory fetches, at some point, the computation needs are likely to be satisfied, and then the GPU will be idle waiting for memory access requests.

One way to decrease bandwidth requirements is to perform what is called texture or image compression. By storing the textures in compressed form in memory, and transfer blocks of compressed textures in compressed form over the bus, it is possible to lower texture bandwidth substantially.

Recently, high dynamic range (HDR) textures have started to become popular. Therefore a number of high-dynamic range texture compression schemes have been introduced [1-3].

Both Munkberg's [1] and Roimela's [2] method depends on treating luminance different from chrominance. The reason being that the eye is less sensitive to errors in the chrominance, thereby fewer bits can be spent for encoding the chrominance as compared to the luminance. However, the transform from RGB color space into luminance/chrominance color space that is used in these prior art methods is costly in terms of hardware.

Wang's algorithm [3] is marred by providing low quality for high bit rates.

SUMMARY

There is therefore a need for en efficient texture and image compression and decompression scheme that can be used for handling HDR textures but does not have the limitations of the prior art schemes mentioned above.

It is a general object of the present invention to provide an efficient image processing scheme that can compress and decompress HDR textures.

This and other objects are met by the invention as defined by the accompanying patent claims.

Briefly, the present invention involves compression and decompression of blocks of pixels having associated property values. In the compression, a pixel block is losslessly compressed into a candidate compressed block. The length of the resulting candidate block is compared to the target bit length. If it exceeds a target bit length, a quantization parameter is provided for the block and the property values are quantized based on this parameter. The block is once more losslessly compressed, though, with the quantized values as input values, to get a new candidate compressed block. This procedure is repeated with different quantization parameters until the bit length of a candidate compressed block is equal to or lower than the target bit length. The resulting candidate compressed block preferably has the lowest possible quantization but still meets the length requirement. A compressed representation of the block is determined based on the bit sequence of the selected candidate compressed block and the bit sequence of an identifier allowing identification of the quantization parameter used for generating the selected candidate compressed block.

When decompressing a compressed pixel block, a first bit sequence corresponding to the candidate compressed block is identified and decoded to get at least one pixel property value. A second bit sequence of the compressed block corresponding to the quantization parameter identifier is identified. If this identifier has a predefined value indicating that no lossy quantization was performed during the compression of the current block, the representation of the property value of a pixel can be determined directly from the decoded property value. However, if the identifier indicates that a lossy quantization has been performed, the decoded property value of a pixel is first dequantized using the quantization parameter indicated by the second bit sequence. The representation of the property value is provided based on this decoded and dequantized value.

The invention also relates to a compressor or encoder and a decompressor or decoder.

The present embodiments provide efficient compression and decompression of textures and can even handle high dynamic range property values.

SHORT DESCRIPTION OF THE DRAWINGS

The embodiments together with further objects and advantages thereof, may best be understood by making reference to the following description taken together with the accompanying drawings, in which:

FIG. 2 is a schematic illustration of a pixel block according to an embodiment;

FIG. 3 is a flow diagram illustrating an embodiment of the losslessly compressing step of the compressing method in FIG. 1;

FIG. 5 is a flow diagram illustrating an embodiment of the quantizing step of the compressing method in FIG. 1 and the dequantizing step of the decompressing method in FIG. 11;

FIG. 6 is a flow diagram illustrating another embodiment of the quantizing step of the compressing method in FIG. 1;

FIG. 7 is a flow diagram illustrating a further embodiment of the quantizing step of the compressing method in FIG. 1;

FIG. 9 is a schematic overview of a compressed representation of a block according to an embodiment;

FIG. 10 is a schematic overview of a compressed representation of a block according to another embodiment;

FIG. 12 is a flow diagram illustrating an embodiment of the dequantizing step of the decompressing method in FIG. 11;

FIG. 13 is a flow diagram illustrating another embodiment of the dequantizing step of the decompressing method in FIG. 11;

FIG. 16 is a schematic block diagram of an embodiment of the lossless compressor of the compressor in FIG. 15;

FIG. 17 is a schematic block diagram of an embodiment of the prediction determiner of the compressor in FIG. 15;

FIG. 18 is a schematic block diagram of an embodiment of the value quantizer of the compressor in FIG. 15;

FIG. 19 is a schematic block diagram of another embodiment of the value quantizer of the compressor in FIG. 15;

FIG. 20 is a schematic block diagram of a further embodiment of the value quantizer of the compressor in FIG. 15;

FIG. 21 is a schematic block diagram of a decompressor according to an embodiment;

FIG. 22 is a schematic block diagram of an embodiment of the representation determiner of the decompressor in FIG. 21;

FIG. 23 is a schematic block diagram of another embodiment of the representation determiner of the decompressor in FIG. 21;

FIG. 24 is a schematic block diagram of a further embodiment of the representation determiner of the decompressor in FIG. 21.

DETAILED DESCRIPTION

Figure 1:
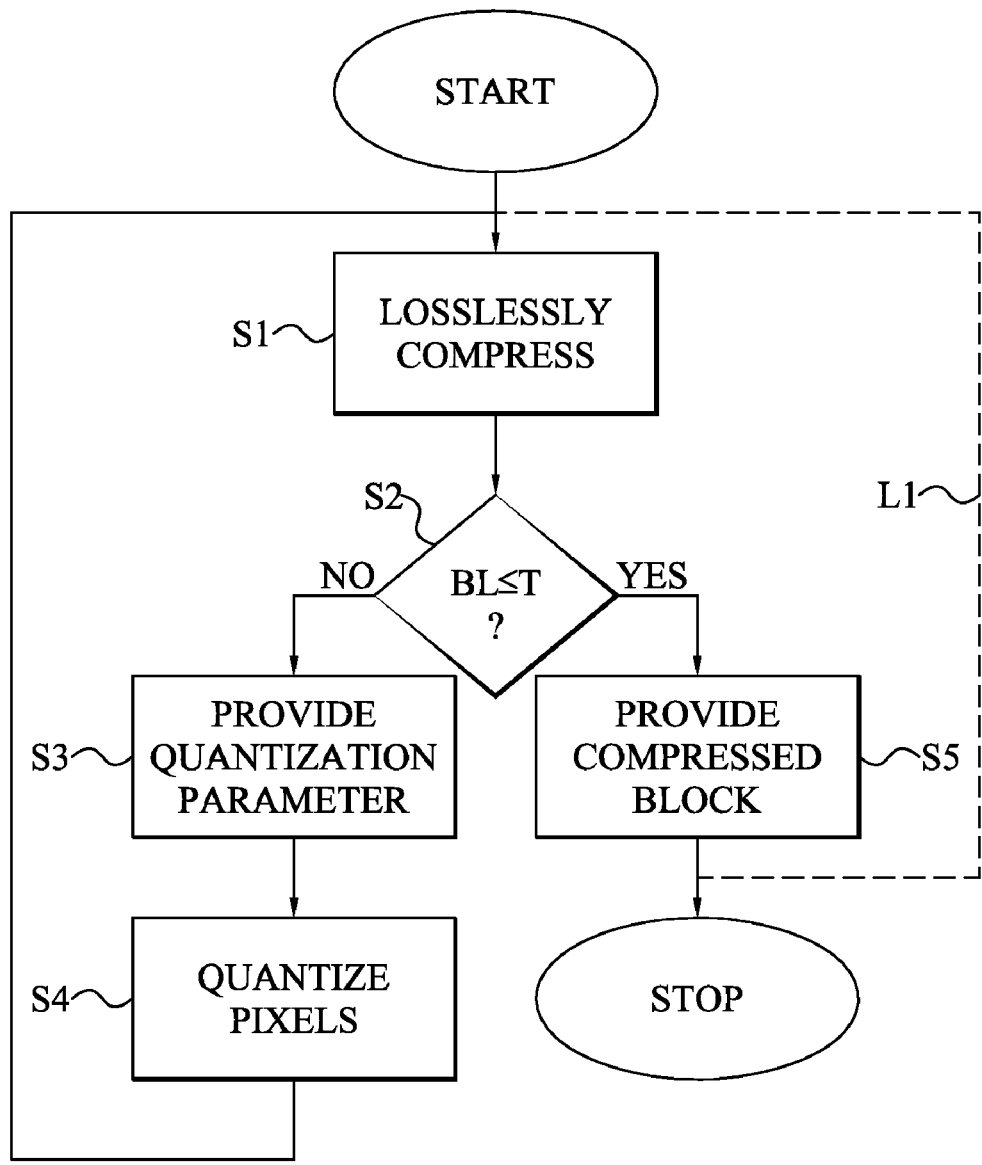
FIG. 1 is a flow diagram illustrating a compressing method according to an embodiment.

Throughout the drawings, the same reference characters will be used for corresponding or similar elements.

The present invention generally relates to compression and decompression of pixel property values, and in particular such a compression and decompression suitable for texture compression and decompression and in particular such processing of high dynamic range textures.

The embodiments are well adapted for usage with three-dimensional (3D) graphics, such as games, 3D maps and scenes, 3D messages, e.g. animated messages, screen savers, man-machine interfaces (MMIs), etc., but is not limited thereto. Thus, also other types of images or graphics, e.g. one-dimensional (1D), two-dimensional (2D) or 3D images, can be processed as disclosed herein.

In the present disclosure, the compression and decompression collectively handles a plurality of pixels, typically in the form of a block of pixel, typically denoted pixel block or tile in the art. In a preferred embodiment, a pixel block has the size of M×N pixels, where M, N are integer numbers with the proviso that both M and N are not simultaneously one. Preferably, $M=2^m$ and $N=2^n$, where m, n are zero or integers with the proviso that m and n are not simultaneously zero. In a typical implementation M=N and preferred such block embodiments could be 4×4 pixels, 8×8 pixels or 16×16 pixels.

The expression pixel or "block element" refers to an element in a block or encoded representation of a block. This block, in turn, corresponds to a portion of an image or texture. Thus, a pixel could be a texel (texture element) of a 1D, 2D, 3D texture, a pixel of a 1D or 2D image or a voxel (volume element) of a 3D image. Generally, a pixel is characterized with an associated pixel parameter or property value.

There are different such characteristic property values that can be assigned to pixels, typically dependent on what kind of pixel block to compress/decompress. For instance, the property value could be a color value assigned to the pixel. As is well known in the art, different color spaces are available and can be used for representing color values. A usual such color space is the so-called red, green, blue (RGB) color space. A pixel property value could therefore be a red value, a green value or a blue value of an RGB color.

A pixel color can also be expressed in the form of luminance and chrominance components. In such a case, a transform can be used for converting a RGB color value into a luminance value and, typically, two chrominance components. Examples of luminance-chrominance spaces in the art include YUV, $YC_oC_g$ and $YC_rC_b$. A property value can therefore also be such a luminance value (Y) or a chrominance value (U, V, $C_o$, $C_g$, $C_r$ or $C_b$). However, the transform from RGB to the other color formats and its corresponding reverse transform are generally costly in terms of hardware. As a consequence, a RGB color is an advantageous pixel color that can be used with the present embodiments.

The embodiments can, though, be used in context of other property values than RGB, which are used for the pixels of textures and images in the art. Thus, a property value of a pixel according to the present invention could be a R value, a G value or a B value of a RGB color or some other property value mentioned above and/or used in the art.

Furthermore, in the following, the term "image" is used to denote any 1D, 2D or 3D image or texture that can be encoded and decoded by means of the present embodiments, including but not limited to bump maps, normal maps, photos, game type textures, text, drawings, high dynamic range images and textures, etc.

The embodiments are advantageously used for compressing HDR property values but can also efficiently be used for processing so-called low dynamic range (LDR) property values. The latter is typically represented by a limited solution of an 8-bit integer in the art. In clear contrast HDR generally involves representing property values using a floating-point number, such as fp16 (also known as half), fp 32 (float) or fp64 (double).

The floating-point nature of halfs, however, leads to problems. Since the density of floating-point numbers is not uniform, the difference between two floats may not be representable as a float with the same precision. This is solved by mapping each floating-point number to a respective integer representation. This basically corresponds to assigning, to each floating-point number, a unique integer number. Thus, the mapping from floating-point to integer domain involves assigning ever higher integer numbers to the ever higher floating-point number. the floating-point number 0.0 will be assigned integer representation 0, the next smallest positive floating-point number is assigned 1, the second next smallest floating-point number is assigned 2 and so on.

Doing the calculations and arithmetic operations in the integer domain also avoids costly floating-point operations. Furthermore, since the compression is lossless, a correct handling of Not a Number (NaN), Infinity (Inf) and denormal numbers (denorms) is also obtained. In such a case, during compression the floating-point numbers are interpreted as integers according to the above-presented mapping. Following decompression, the integer numbers are then re-interpreted back into floating-point numbers through the one-to-one mapping between integer and floating-point numbers described above.

The present invention relates to block compression or coding and decompression or decoding that is adapted for textures and other image types, where random access and fixed-rate are required. As is known in the art, texels and pixels in textures can be accessed in any order during rasterization. A fixed-rate texture compression system is therefore desirable as it allows random addressing without complex lookup mechanisms. Furthermore, the decompression should preferably be fast and relatively inexpensive to implement in hardware of a GPU even though these requirements are not necessarily required for the compression which can be performed "off-line" in a central processing unit (CPU).

The traditional approach in the art has been to use a lossy compression scheme to achieve the fixed bit rate. The present invention, though, takes a radically different approach by utilizing a lossless compression together with a separate quantization procedure. This allows the quantization level of the property values of the pixels to be individually adjusted on block basis to thereby achieve as high quality as possible and still be within the bit budget of the fixed target bit length for the blocks.

Compression

FIG. 1 is a flow diagram illustrating a method of compressing a block of multiple pixels according to an embodiment. Each pixel of the block has at least one respective pixel property value, such as a respective R, G and B value.

The method starts in step S1, where the original property values of the block are compressed losslessly using a defined lossless compression algorithm to get a candidate compressed representation of the block and its property values of the block. Given the nature of the lossless compression in step S1, the resulting bit length of the candidate compressed block could be larger than or equal to (corresponds to the situation where lossless compression is actually not possible) or smaller than the original bit length of the block, defined as N×M×O, where N represents the number of pixels in a row of the block, M represents the number of pixels in a column of the block and O the total number of bits of the respective pixel property values for a pixel, typically 3×16 for a HDR texture.

Any lossless compression algorithm adapted for handling the particular property value, preferably half color values, known in the art can actually be used in step S1. As is discussed further herein, a prediction-based lossless compression is typically preferred.

A next step S2 compares the resulting bit length, BL, of the candidate compressed block with a defined target or threshold bit length, T. In a preferred embodiment, this target bit length T is preferably defined as $T=T_{target}-T_{QP}$, where $T_{target}$ is the total number of bits that can be spent on a compressed block due to the fixed rate requirements and $T_{QP}$ is the number of bits required for an identifier of a quantization parameter assigned to the compressed block, which is discussed further herein.

If the bit length of the candidate compressed block is equal to or smaller than the target bit length in step S2, the method continues to step S5. This step S5 provides a compressed representation of the pixel block based on the lossless candidate compressed block from step S1. Furthermore, the compressed representation preferably also comprises a quantization parameter identifier having a value indicating that the current block could indeed be compressed losslessly and still achieve the target bit length. The total size of the compressed representation is $BL+T_{QP}$ bits, which meets the requirement $BL+T_{QP} \leq T_{target}$.

The method then ends or preferably returns to step S1 where other blocks or tiles of the current image or texture are compressed, which is schematically indicated by the line L1.

If, however, the bit length of the candidate compressed block from step S1 exceeds the target bit length in step S2, the method continues to step S3. A quantization parameter indicative of a lossy processing and applicable to the current block for the purpose of quantizing the pixel property values of the block is provided in step S3. This quantization parameter is used in a next step S4 for the purpose of quantizing the property values of the block into quantized pixel property values.

The block is then once more losslessly compressed in step S1, however, with the quantized property values as input instead of the original property values. Thus, even though the compression performed in step S1 as such is lossless, the resulting candidate compressed block will typically be a lossy compressed representation of the block due to the quantization step S4. The lossless compression of step S1 is performed in the same way as for the first round, though with the important exception that now the quantized property values are the input data instead of the original property values.

The bit length of the resulting compressed block is once more compared to the target bit length in step S2. Note that the target bit length used in this second round of step S2 may be different from the target bit length used in the first round. The reason for this is that the number of bits required for an identifier of the quantization parameter may be different each time step S2 is performed.

As a consequence of the quantization performed in step S4, the block can preferably be compressed to a shorter bit length in the lossless compression as compared to using original, unquantized values. This means that the bit length after the second lossless compression is preferably shorter than after the first round.

If the resulting bit length now is equal to or smaller than the target bit length in step S2, the method continues to step S5, where the compressed representation of the block is provided based on the candidate compressed block following the quantization and the subsequent lossless compression. Furthermore, the compressed representation preferably also comprises an identifier of the quantization parameter employed in step S4 for the current candidate compressed block, which parameter further indicates that the candidate block has been obtained through lossy processing due to the quantization.

If the bit length, however, still exceeds the target bit length in step S2, the method continues to step S3. In this step a quantization parameter is provided. In a preferred embodiment, this quantization parameter is different from the quantization parameter used in the first round of the loop defined by steps S1, S2, S3 and S4. In such a case, this quantization parameter is used in step S4 for quantizing the original property values to get new quantized property values for the block. This is a preferred approach, i.e. applying a new quantization parameter to the original pixel property value each time the loop of steps S1 to S4 is performed.

An alternative approach instead applies the quantization parameter provided in step S3 to the quantized property values obtained after the first round of the loop. Thus, if $f_{QP}(\ )$ denotes the operation of quantizing a pixel property value $p_{ij}$, the quantized property value after the second round of the loop would be $f_{QP}(f_{QP}(p_{ij}))$ if the same quantization parameter is used in both rounds.

The loop of steps S1 to S4 is repeated with new quantization procedures conducted in step S4 based on the quantization parameter from step S3 followed by the lossless compression of step S1 until the bit length of the compressed block is equal to or smaller than the target bit length. This procedure could be performed by applying the smallest possible quantization the first time step S4 is conducted and then subsequently increasing the quantization each following round of the loop. In such a case, the first candidate compressed block having a bit length being equal to or smaller than the target bit length is selected and used for providing the compressed representation of the block in step S5.

In an alternative approach, the largest available quantization is performed the first time step S4 is active and then the quantization is stepped down each and every following round of the loop. In such a case, the candidate compressed block is the one that has bit length below the target bit length and precedes the round resulting in the first candidate compressed block having a length that exceeds the target bit length.

Alternative searches are of course possible, such as utilizing a binary search among the available quantization parameters. For instance, the first time the step S3 is performed, the quantization parameter resulting in the smallest quantization of the pixel property values in step S4 is provided. If, following the quantization with this parameter and the lossless compression of step S1, the bit length exceeds the target bit length, the next round of step S3 tests the quantization parameter that is in between the one given the smallest quantization in step S4 and the parameter resulting in the largest available quantization. If the bit length still exceeds the target bit length, the quantization parameter resulting in a quantization between maximum quantization and the "middle" quantization is selected and so on. If instead the bit length is below the target bit length, the quantization parameter resulting in a quantization between minimum quantization and the "middle" quantization is selected. This procedure is preferably repeated until there is no more "middle" quantization in between the smallest quantization that still does not meet the target length and the smallest quantization that meets the target length. The latter quantization parameter is then chosen.

Preferably, the maximum quantization is set at a level where every possible block is guaranteed to be below the target bit length after compression.

Generally, the candidate compressed block for which as small quantization as possible have been conducted in step S4 but still has a bit length that is equal to or smaller than the target bit length becomes selected by the method of FIG. 1 and is used for providing the compressed block representation of step S5.

Once the block has been correctly compressed in step S5 and meets the target bit length requirements of step S2, the method ends or returns to step S1 for the purpose of compressing a new pixel block of the texture.

Note that given an input texture to be compressed according to the method disclosed in FIG. 1, different pixel blocks may be compressed using different levels of quantization. For instance, a first set of the blocks are losslessly compressed and therefore have a quantization parameter representing lossless compression. Other sets of input block must be quantized in order to reach the target bit length when compressed losslessly. Some of these may therefore use a first quantization parameter, others use a second quantization parameter and so on.

The lossless compression employed in the compressing method is preferably a prediction-based compression algorithm. FIG. 3 illustrates such an algorithm. The method starts in step S10, where a prediction of the property value is determined for a pixel to be encoded. The prediction base is preferably one or more neighboring pixels present adjacent the current pixel, typically present in the same row or column.

A next step S11 calculates a prediction error for the pixel based on the original or quantized property value of the pixel and its prediction. A preferred implementation calculates the prediction error as a difference between the property value and its prediction: $\tilde{p}_{ij}=p_{ij}-\hat{p}_{ij}$, where $p_{ij}$ represents the original or quantized property value, $\hat{p}_{ij}$ is the prediction of the original or quantized property value and $\tilde{p}_{ij}$ is the prediction error.

The step S10 and S11 are preferably repeated for at least a portion of the multiple pixels in the block. In such a case, each of these pixels has an associated prediction error. One or more pixels of the block can be used as start or restart pixels and therefore do not have any predictions or prediction errors. The values of these are therefore preferably encoded explicitly in the candidate compressed blocks, without prediction or entropy encoding.

The prediction errors from step S11 are entropy encoded in the following step S12 to thereby get respective encoded representation of the pixels. A candidate compressed block then comprises these entropy encoded prediction errors and preferably the above-mentioned start/restart pixel property values. The method continues to step S2 of FIG. 1, where the bit length of the resulting candidate compressed block is evaluated.

Herein a more detailed description of an embodiment of a lossless, prediction-based compression algorithm is presented. The present invention is, though, not limited thereto but can instead use varying modifications to the presented algorithm and also other known lossless compression algorithms in the art.

In a preferred embodiment, a start property value is first selected for the block to be compressed. This start property value is preferably the property value of a pixel at a defined position in the block. With reference to FIG. 2 illustrating an example of a pixel block 300, this defined position is preferably the first pixel position 310 in the block, i.e. occupying the upper left corner. Other examples of possible start pixel positions could be any of the other block corners. Actually any predefined position in the block could be used as start position although a corner position, and in particular the upper left corner pixel 310, significantly simplifies the compression of the block.

In the case of compressing a texture where each pixel has a respective R, G and B component, the start property value is selected to be equal to one of the color components, preferably the red component, of the start pixel 310. The candidate compressed block comprises a representation of the selected start property value, $p_{start}=R_{11}$.

In the following, the compression is discussed further with compressing the pixels where the pixel property values are red color components. This should, however, merely be seen as an illustrative but non-limiting example. Thereafter, predictions of remaining pixels 311, 312, 313, belonging to the same row or column in the block as the start pixel 310 are determined. In a preferred implementation, this involves determining red color component prediction based on the red color component of the previous neighboring pixel in the pixel row or column of the block. For instance, a pixel 311, 312 in the first row could have a prediction $\hat{R}_{1j}$ equal to $R_{1(j-1)}$, where $j=2, 3, \ldots$ and $R_{11}$ is the start component value selected above. The corresponding prediction for a pixel 313 in the first column is defined as $\hat{R}_{i1}=R_{(i-1)1}$, where $i=2, 3, \ldots$ and $R_{11}$ is the start component value. Alternatively, the prediction is determined based on the immediate preceding pixel in the first row/column and the next preceding pixel, such as $\hat{R}_{ij}=f(R_{1(j-1)}, R_{1(j-2)})$ and, for instance, $\hat{R}_{1j}=2R_{1(j-1)}-R_{1(j-2)}$, where $j=3, \ldots$.

The predictions for the red color components of the pixels 311, 312, 313 have now been determined and the algorithm continues by providing prediction for remaining pixels 314, 315, 316, 317 in the block. This procedure is illustrated in the flow diagram of FIG. 4. The prediction providing operation starts in step S20. This step S20 involves calculating a difference between the red color component of a first neighboring pixel 316 in the block 300 and the red color component of a second neighboring pixel 315 in the block 300. Thus, these two neighboring pixels 315, 316 are adjacent the current pixel 317 to compress in the block 300. Furthermore, the pixels 315, 316 are relating to two different prediction directions relative the current pixel 317. In a preferred embodiment, the two neighboring pixels 315, 316 include a previous pixel 316 in a same row of the block 300 and a previous pixel 315 in a same column of the block 300.

The calculation of step S20 preferably involves calculating the difference $R_{(i-1)j}-R_{i(j-1)}$, where $R_{ij}$ denotes the red color component of pixel at block position (i,j). As it is the magnitude of the difference that is of relevance and not the sign, the absolute difference can be calculated in step S20 $|R_{(i-1)j}-R_{i(j-1)}|$. In an alternative approach, the squared difference is instead calculated in step S20 $(R_{(i-1)j}-R_{i(j-1)})^2$. Also other representations of magnitudes than these two are of course also possible.

In either case, the calculated difference representation is then compared to a defined threshold h. The comparison can therefore be realized as $$|R_{(i-1)j} - R_{i(j-1)}| \underset{?}{\lessgtr} h \text{ or } (R_{(i-1)j} - R_{i(j-1)})^2 \underset{?}{\lessgtr} h^2.$$

If the difference between the red components of the neighboring pixels 315, 316 is smaller than the threshold, the method continues from step S20 to step S21 otherwise it continues to step S22.

The value of the threshold h can be determined in an optimization procedure having as optimization goal to compress as many blocks of different textures as possible and furthermore resulting in as short block compression lengths, in terms of number of bits, as possible. A non-limiting example of a threshold value that can be used according to the present invention and obtained from a preliminary optimization procedure is h=2048. However, the actual value of the threshold depends on a number of factors, including the particular color format used, the available range for color component values, etc. This value 2048 works well for RGB colors, where the color components are represented as half-precision floating-point numbers.

Step S21 involves calculating the color component prediction of the current pixel 317 based on the red color components of the two neighboring pixels 315, 316. In other words, $\hat{R}_{ij}=f(R_{(i-1)j}, R_{i(j-1)})$, where $\hat{R}_{ij}$ is the prediction of the current pixel $R_{ij}$ and f( ) is a function, preferably defining a first weighted combination of the two neighboring red color components, $\hat{R}_{ij}=w_{(i-1)j}^1 R_{(i-1)j}+w_{i(j-1)}^1 R_{i(j-1)}$. The first weighted combination may also be rounded, floored or ceiled to get integer prediction values.

In a preferred embodiment, step S21 calculates the pixel prediction based on an average of the red color components of the two neighboring pixels, $$\hat{R}_{ij} = f\left(\frac{R_{(i-1)j} + R_{i(j-1)}}{2}\right),$$

i.e. $w_{(i-1)j}^1 = w_{i(j-1)}^1 = 0.5$. In a preferred implementation, the calculated average is employed as prediction, i.e. $\hat{R}_{ij}=0.5\times R_{(i-1)j}+0.5\times R_{i(j-1)}$. If only integer predictions are employed, the quotient can be rounded or input to a floor according to $\hat{R}_{ij}=\lfloor 0.5\times R_{(i-1)j}+0.5\times R_{i(j-1)}\rfloor$ or instead the ceiling counterpart. Other predictions determined based on the average are also possible such as $$\hat{R}_{ij} = 2 \times \frac{R_{(i-1)j} + R_{i(j-1)}}{2} - R_{(i-1)(j-1)}.$$

If the difference is instead not smaller than the threshold as investigated in step S20, the method continues to step S22. Step S22 comprises calculating a first difference between the red color component of the current pixel 317 and a second weighted combination $WC_2$ of the red color components of the neighboring pixels 315, 316. Step S22 also involves calculating a second difference between the red color component of the current pixel 317 and a third different weighted combination $WC_3$ of the red color components of the neighboring pixels 315, 316. The color component prediction of the pixel 317 is then selected to be based on, preferably equal to, one of the second and third weighted combination of the two neighboring red components. Furthermore, this prediction selection is performed based on the two calculated differences. Generally, the weighted combination that is closest to the red component of the investigated pixel is selected. Thus, if $|R_{ij}-WC_2|<|R_{ij}-WC_3|$, or equivalently $(R_{ij}-WC_2)^2<(R_{ij}-WC_3)^2$ or indeed, though less preferred, $|R_{ij}-R_{(i-1)j}|<|R_{ij}-R_{i(j-1)}|$, the second weighted combination of the red color components is selected as the red prediction in step S23, $\hat{R}_{ij}=WC_2$, otherwise the third weighted combination is selected as the red prediction in step S24, $\hat{R}_{ij}=WC_3$.

The three weighted combinations of the two neighboring red color components are different weighted combinations, i.e. use different weights: $WC_1=w_{(i-1)j}^1 R_{(i-1)j}+w_{i(j-1)}^1 R_{i(j-1)}$, $WC_2=w_{(i-1)j}^2 R_{(i-1)j}+w_{i(j-1)}^2 R_{i(j-1)}$ and $WC_3=w_{(i-1)j}^3 R_{(i-1)j}+w_{i(j-1)}^3 R_{i(j-1)}$. As was discussed above, in connection with the first weighted combination, the second and third weighted combinations may be rounded, floored or ceiled to get integer values.

The weights $w_{(i-1)j}^1$, $w_{i(j-1)}^1$ of the first weighted combination or linear combination are non-zero weights and are preferably in the interval $0<w^1<1$. The weights for the second and third weighted combinations are preferably also non-zero but one per weighted combination may be zero. In such a case, $WC_2=w_{(i-1)j}^2 R_{(i-1)j}$ with preferably $w_{(i-1)j}^2=1$ and $WC_3=w_{i(j-1)}^3 R_{i(j-1)}$ with preferably $w_{i(j-1)}^3=1$. In a preferred embodiment $w_{i(j-1)}^2=(1-w_{(i-1)j}^2)$ and $w_{i(j-1)}^3=(1-w_{(i-1)j}^3)$, with $0 \leq w_{(i-1)j}^2, w_{(i-1)j}^3 \leq 1$. More preferably, $w_{(i-1)j}^3=(1-w_{i(j-1)}^2)$. In such a case, the second weighted combination is $WC_2=w_{(i-1)j}^2 R_{(i-1)j}+(1-w_{(i-1)j}^2)R_{i(j-1)}$ and the third weighted combination is $WC_3=(1-w_{(i-1)j}^2)R_{(i-1)j}+w_{(i-1)j}^2 R_{i(j-1)}$. And example of suitable weight values for the second and third combinations could be $WC_2=0.75R_{(i-1)j}+0.25R_{i(j-1)}$ and $WC_3=0.25R_{(i-1)j}+0.75R_{i(j-1)}$. In the case $w_{(i-1)j}^2=1$ and $w_{i(j-1)}^2=0$, $WC_2=R_{(i-1)j}$ and $WC_3=R_{i(j-1)}$. This corresponds to selecting one of the red components of the two neighboring pixels 315, 316 as prediction of the red component of the current pixel 317.

The method then continues to step S25, where a guiding bit associated with the selected prediction is provided. Thus, if the second weighted combination was selected as red prediction in step S23, the guiding bit could be set to $0_{bin}$ or $1_{bin}$. However, if instead the third weighted combination is selected in step S24, the guiding bit could be $1_{bin}$ or $0_{bin}$.

The method then continues to step S11 of FIG. 3, where the prediction error is calculated based on the red component of the current pixel 317 and the prediction provided in step S21, S23 or S23. The prediction error $\tilde{R}_{ij}$ is preferably calculated as a difference between the original red component of the pixel $R_{ij}$ and its prediction $\hat{R}_{ij}$, $\tilde{R}_{ij}=R_{ij}-\hat{R}_{ij}$.

Whereas the red color component is encoded independently of the other data, the green color component is preferably encoded relative to the red components. In such a case, a respective component difference is calculated for each pixel 310-317 in the block 300. This component difference is a difference between the green and red component of the pixels, $G_{ij}-R_{ij}$. Thereafter a respective prediction for the second color components in the block is provided.

For those pixels 311, 312, 313 present on a same row or column as the start pixel 310, the compression is performed similar to the red color component with the exception that the difference between the green and red color components is used. Thus, pixels 311, 312, 313 of the same row as the start pixel 310 may have second prediction errors as:

$$G_{1j}\tilde{-}R_{1j}=(G_{1j}-R_{1j})-(G_{1j}\hat{-}R_{1j})=(G_{1j}-R_{1j})-(G_{1(j-1)}-R_{1(j-1)}).$$

The remaining pixels 314, 315, 316, 317 in the block 300 are encoded as follows. Firstly, it is investigated whether the absolute/squared difference between the red color components of the two neighboring pixels 315, 316 exceed the threshold as in step S20 of FIG. 4. Thus, even though predictions of the green color component are to be provided, the investigation employs red color component values.

If the difference is smaller than the threshold, the prediction is calculated based on the first weighted combination of a first difference between the green and red color components of the first neighboring pixel 316, and a second difference between the green and red color components of the second neighboring pixel 315. In other words, $G_{ij}\hat{-}R_{ij}=w_{(i-1)j}^{1}(G_{(i-1)j}-R_{(i-1)j})+w_{i(j-1)}^{1}(G_{i(j-1)}-R_{i(j-1)})$, or a rounded, floored or ceiled weighted combination. In a preferred embodiment, the prediction is preferably calculated based on the average of the two component differences and more preferably equal to the average, $$G_{ij} \hat{-} R_{ij} = \left\lfloor \frac{(G_{(i-1)j} - R_{(i-1)j}) + (G_{i(j-1)} - R_{i(j-1)})}{2} \right\rfloor$$

in the case of a floor function.

Figure 4:
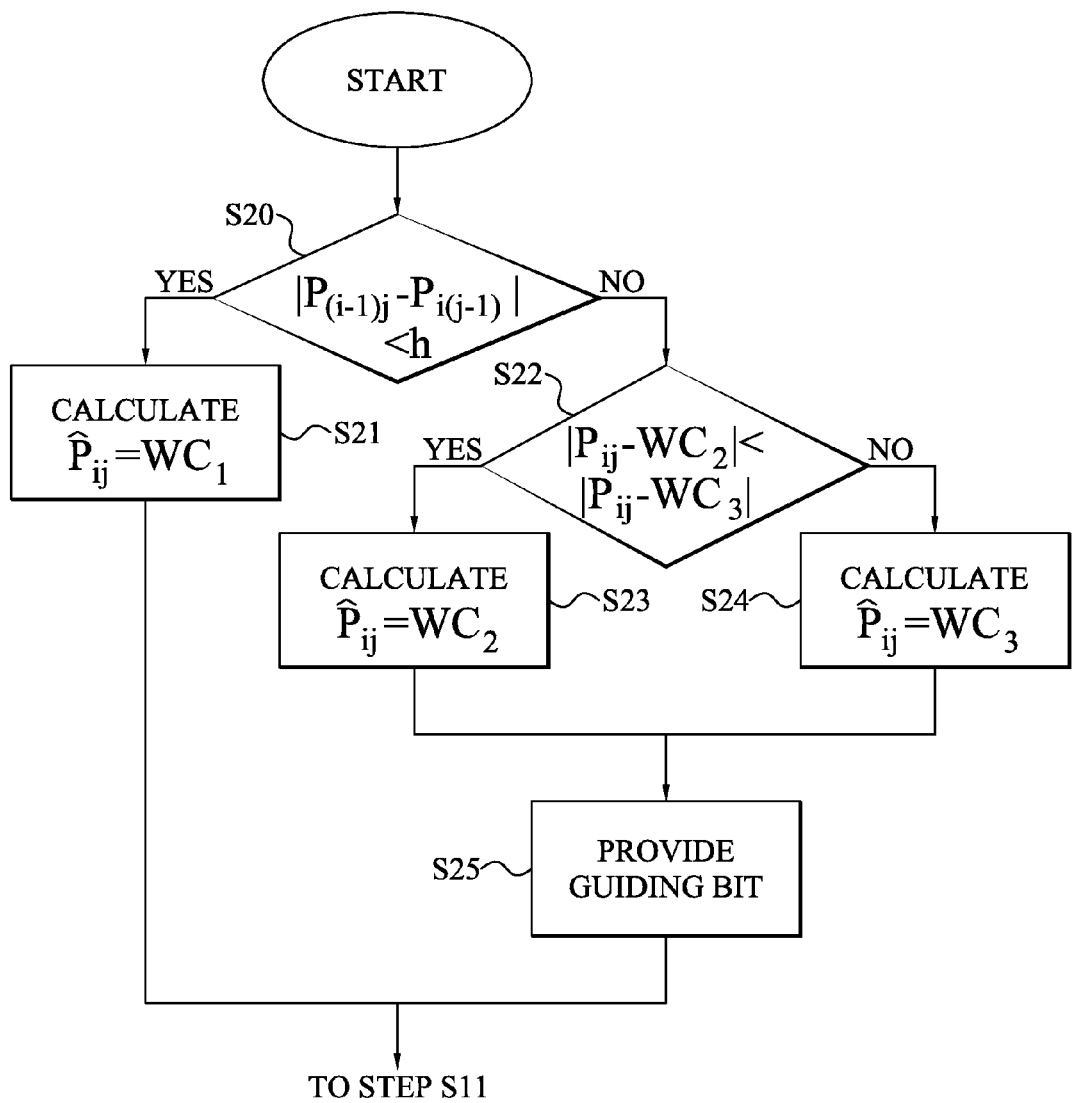
FIG. 4 is a flow diagram illustrating an embodiment of the prediction determining step of the compressing method in FIG. 3.

However, if the absolute difference between the neighboring red color components exceeds the threshold, the algorithm instead continues by using the guiding bit determined in step S25 of FIG. 4 for the current pixel 317 to select either the second weighted combination of the two differences as prediction $G_{ij}\hat{-}R_{ij}=w_{(i-1)j}^{2}(G_{(i-1)j}-R_{(i-1)j})+w_{i(j-1)}^{2}(G_{i(j-1)}-R_{i(j-1)})$, i.e. select a first prediction direction, or the third weighted combination as prediction $G_{ij}\hat{-}R_{ij}=w_{(i-1)j}^{3}(G_{(i-1)j}-R_{(i-1)j})+w_{i(j-1)}^{3}(G_{i(j-1)}-R_{i(j-1)})$, i.e. select a second prediction direction. These second and third weighted combinations may also be rounded, floored or ceiled.

In a preferred embodiment, the weights employed for determining the three different weighted combinations of color component differences described above are the same weights that was employed for determining the three different weighted combinations of red color components.

Thereafter, the prediction error for the green color component of the pixel 317 is calculated as the difference between green and red components of the pixel and the selected prediction $G_{ij}\tilde{-}R_{ij}=(G_{ij}-R_{ij})-(G_{ij}\hat{-}R_{ij})$.

The same procedure is then performed for the blue and remaining color component as discussed above. However, in this case the difference between the blue and the green component is calculated, $B_{ij}-G_{ij}$. In an alternative approach, the difference is instead calculated between the blue and the red component in step, $B_{ij}-R_{ij}$.

The entropy encoding step S12 of FIG. 3 is preferably performed, in connection with the above-described embodiment of lossless compression, as discussed below. The prediction errors are preferably first modified to get positive predictive errors. This modification preferably involves applying the function n(x)=−2x to negative prediction errors (including zero errors) and the function p(x)=2x−1 to positive ones (excluding zero errors), where x here denotes the input pixel error. This will result in a new arrangement of prediction errors as {0,1,−1,2,−2,3,−3,...}, which means that numbers of small magnitudes will have small value. Each modified prediction error is then preferably Golomb-Rice encoded [5-6] to obtain the encoded representation.

The Golomb-Rice encoding involves searching for an exponent number k. This number k is preferably employed for a set of at least one pixel in the block. For instance, four pixels in a 2×2 group in the block can share the same k. An exhaustive search among available values of k, such as between 0 and 15 can be used to find the best k for the group. However, the search can be computationally reduced by only looking at a selected portion of the available k values. This preferred k searching comprises searching for a k in an interval of [p-4,p], where p is the bit position of the most significant bit of the largest prediction error of the pixel group.

Thereafter, each prediction error of the group is divided by $2^k$ to form a respective quotient and a remainder. The quotients are unary encoded, preferably performed according to Table 1 below.

TABLE 1 unary codes

| Unary code | Quotient |
|---|---|
| $0_{bin}$ | 0 |
| $10_{bin}$ | 1 |
| $110_{bin}$ | 2 |
| $1110_{bin}$ | 3 |
| $11110_{bin}$ | 4 |
| ... | ... |

Unary encoding assigns longer codes to larger values as is evident from Table 1. Generally values larger than 31 are encoded using $0\times\text{ffff}_{hex}$, followed by the 16 bits of the value.

The encoded representation of the prediction error comprises the unary code and the k bits of the remainder. In addition, the value k is stored for the group of pixels. This procedure is performed for each pixel in the block with the exception of the start pixel. As was mentioned above, the original color component value for this pixel is stored as start component values, respectively.

Even though Golomb-Rice coding is a possible coding algorithm that can be used, the present invention is not limited thereto. Instead other coding algorithms, including Huffman coding [7] or Tunstall coding [8], can alternatively be employed.

FIG. 10 is a schematic illustration of a compressed representation 400 of a pixel block compressed according to the above-described compression algorithm. The compressed block 400 comprises the quantization parameter identifier 410. The compressed block representation 400 also comprises the candidate compressed block 420. This candidate compressed block 420 includes a representation 422 of the start property value. The candidate compressed block 420 further comprises representations 424 of the determined k values, the guiding bits 426 and the unary code of the quotient and the remainders from the Golomb-Rice encoding, denoted encoded error representations 428 in the figure. The actual order of the included components of the compressed block 400 may differ from what is illustrated in FIG. 10.

Another possible lossless compression algorithm that can be used according to the present invention is based on the Weinberger predictor [4]. With reference to FIG. 2, this predictor determines the prediction of a property value of a current pixel 317 based on the property values of the neighboring pixels 314, 315, 316 in three prediction directions. More specifically the prediction is:

$$\hat{p}_{ij} = \min(p_{i(j-1)}, p_{(i-1)j}) \text{ if } p_{(i-1)(j-1)} \geq \max(p_{i(j-1)}, p_{(i-1)j})$$

$$\hat{p}_{ij} = \max(p_{i(j-1)}, p_{(i-1)j}) \text{ if } p_{(i-1)(j-1)} \leq \min(p_{i(j-1)}, p_{(i-1)j})$$

$$\hat{p}_{ij} = p_{i(j-1)} + p_{(i-1)j} - p_{(i-1)(j-1)} \text{ otherwise}$$

Prediction errors are then calculated as previously described. The calculated prediction errors are then input to an entropy encoder, such as the above-described Golomb-Rice encoder, first disclosed in [5]. Alternatively, Huffman or Tunstall encoding can be used.

Another lossless compression algorithm that can be used according to the present invention is based on the R32 predictor. The pixels 311, 312, 313 in the first row and column are predicted based on the most intermediate neighboring pixel in the same row or column. The remaining pixels are then predicted in scan-order, i.e. row-by-row starting with the second pixel of the second row. Each of these remaining pixels is predicted based on the property value of the preceding pixel present in the same row. Prediction errors are then calculated and entropy encoded, using any of the above described entropy encoder.

The present invention is not necessarily limited to usage of prediction-based lossless compression algorithms. In clear contrast, other forms of lossless compression techniques in the art can be used. For instance, PIZ [9] can be used. Briefly, PIZ performs a Haar wavelet transform on the property values in the block to get resulting symbols. Run-length encoding (RLE) then replaces runs of symbols, i.e. sequences in which the same symbol value occurs in many consecutive data elements, with a single symbol value and a count. For instance, assume a pixel block where the property values of the first 15 pixels have value $p_1$ and the last pixel has value $p_2$. Run-length encoding replaces the sequence of 15 $p_1$ and one $p_2$ with the following code $15p_1 1p_2$. The resulting values after PIZ and RLE can then be entropy encoded, for instance using Huffman.

FIG. 5 is a flow diagram illustrating an embodiment of the quantizing step S4 of FIG. 1. The method continues from step S3 in FIG. 1. A next step S30 shifts the property values of the block bitwise a number of steps to the right, where this number of steps is defined by the quantization parameter provided in step S3. Thus, assume that the quantization parameter has a value s. The property values in the block are then shifted s steps to the right to get the quantized values, $p_{ij}^q = p_{ij} >> s$.

In an alternate embodiment it is possible to add a constant of $1 << (s-1)$ before shifting s steps to ensure correct rounding.

In this embodiment, the quantization parameter s can have any value from zero (corresponds to zero quantization) and positive integer value equal to or larger than one up to 15 in the case of halfs. The quantization parameter therefore needs 4 bits. If the fixed bit rate for the blocks is $T_{t\,arg\,et}$ bits, the target bit length used in FIG. 1 will be $T = T_{t\,arg\,et} - 4$ bits.

In such a case, the pixel block is first losslessly compressed without any quantization. If the bit length of the resulting candidate block meets the target bit length, the quantization parameter with value zero is preferably stored together with the candidate block as the compressed representation of the block. Otherwise, the quantization parameter can be increased by one for each subsequent round of compression until the resulting bit length of the candidate compressed block is equal to or below the target bit length.

FIG. 6 illustrates an alternative embodiment of the quantizing step. As is known in the art, shifting a bit pattern s steps to the right is the same as dividing the value with $2^s$. However, such an approach limits the denominators to different powers of two. It can sometimes be advantageous to also use denominators that are not power of two. For instance, assume that the target bit length is 252 bits and usage of a shift quantization parameter s=3 gives a bit rate of 260 that will not fit into the bit budget. On the other hand, a shift using s=4 might give a bit rate of 200, well below 252 but also with much lower quality. In such a case, it might be interesting to use division with a denominator d that is in between $2^3$ and $2^4$, such as d=12, which might give a rate of 239 which fits into the bit budget and still gives good quality. In this embodiment, it is even possible to use non-integer divisors.

This embodiment therefore involves dividing the property values with the provided quantization parameter in step S40 and then rounding the quotients in the following step S41. This rounding can be performed using the ceiling function, the floor function or the round function, well known in the art. Thus, $$p_{ij}^q = \left\lceil \frac{p_{ij}}{d} \right\rceil, \; p_{ij}^q = \left\lfloor \frac{p_{ij}}{d} \right\rfloor \text{ or } p_{ij}^q = \text{round}\left(\frac{p_{ij}}{d}\right).$$

In a preferred embodiment, the number of allowable quantization parameters, i.e. denominators in this example, is limited to a set of parameters. Otherwise, the bit length of the quantization parameter becomes variable, which in turn affects the target bit length used in step S2 of FIG. 1. A preferred approach for this embodiment is therefore to have access to a table with pre-defined denominators, such as the illustrative example of Table 2 below.

TABLE 2 denominator quantization parameters

| Code | Denominator |
|---|---|
| $0000_{bin}$ | 1 |
| $0001_{bin}$ | 8 |
| $0010_{bin}$ | 9 |
| $0011_{bin}$ | 10 |
| $0100_{bin}$ | 11 |
| $0101_{bin}$ | 12 |
| $0110_{bin}$ | 16 |
| $0111_{bin}$ | 32 |
| $1000_{bin}$ | 64 |
| $1001_{bin}$ | 128 |
| $1010_{bin}$ | 256 |
| $1011_{bin}$ | 512 |
| $1100_{bin}$ | 1024 |
| $1101_{bin}$ | 2048 |
| $1110_{bin}$ | 4096 |
| $1111_{bin}$ | 8192 |

This then means that only the fixed-bit length identifier, i.e. table index, of the selected quantization parameter is stored in the compressed representation of the block instead of the whole quantization parameter value. Note that the code $0000_{bin}$ in Table 2 giving a denominator of 1 defines lossless compression, i.e. no quantization.

FIG. 7 is a flow diagram of a further embodiment of the quantization step S4 of FIG. 1. The method continues from step S3 of FIG. 1. A next step S50 identifies the minimum and maximum property values in the block. Optionally, the difference between the maximum and minimum values is calculated and the bit length of this difference is noted, bit(diff). In order to encode the property values as offsets from the minimum value or indeed the maximum value in a bit exact manner it takes bit(diff) bits. The quantization according to this embodiment is then to reduce the number of available offset values. This reduction can be performed according to many different embodiments in step S51. A first embodiment uses a fixed number of intermediate values that are different linear combinations of the maximum and minimum values, such as $$\frac{kp_{min} + (7-k)p_{max}}{7}$$

for the case with six intermediate values, where $p_{min/max}$ denotes the minimum/maximum property value in the block and $k=1, 2, \ldots, 6$ ($k=0$ corresponds to the maximum value and $k=7$ gives the minimum value).

Alternatively, the number of available offset values can be calculated based on the value of bit(diff), such as $$\text{bits}(noOfOffset) = \max\left(1, \frac{\text{bit}(diff)+1}{2}\right).$$

This results in roughly half the number of bits and works well in practice. The quantization according to this embodiment therefore divides the minimum-maximum interval in $2^{bits(noOfOffset)}$ steps, where the step size is calculated as stepSize=1<<(bit(diff)−bit(noOfOffset)).

Yet another embodiment is to allow a variable number of offset values, and to signal how many are used. For complicated blocks, a smaller number of allowed offset values may be used, whereas for simple blocks, a larger number of allowed offset values may be used. The information on how many offset values are allowed are then stored in the candidate compressed block.

For each pixel, a value index to any of the allowable quantized values is determined by first calculating the distance to the minimum or maximum value: $distToMin_{ij}=p_{ij}-p_{min}$ or $distToMax_{ij}=p_{max}-p_{ij}$. The value index for the pixel is then determined as:

$$index_{ij} = \text{round}\left(\frac{distToMin_{ij}}{stepSize}\right)$$

or $$index_{ij} = \text{round}\left(\frac{distToMax_{ij}}{stepSize}\right).$$

If the property value for the pixel is equal to the maximum value or minimum value, $p_{ij}=p_{max}$ or $p_{ij}=p_{min}$, the value index is preferably set to be equal to a max index: $index_{ij}$=max Index or min $index_{ij}$=min Index.

This effectively quantizes each pixel offset value to a value index of fewer bits. These value indices can then be input to a predictor, such as the one described herein, Weinberger or R32 predictor. This means that the value index of the start pixel is stored uncoded in the candidate compressed block. For other pixels a respective prediction is calculated based on the corresponding value index/indices of one or more neighboring pixels according to the particular predictor. Respective prediction errors are calculated and entropy encoded, for instance using a Golomb-Rice entropy encoder.

An extension to this embodiment is to calculate the distribution of value indices and increase the number of steps, i.e. decrease quantization, where the distribution is denser and consequently decrease the number of steps, i.e. increase quantization, where the distribution of property values is more sparse.

A preferred implementation of this embodiment calculates a respective distance value to both the maximum and minimum values for the pixels in the block, $distToMin_{ij}=p_{ij}-p_{min}$ and $distToMax_{ij}=p_{max}-p_{ij}$. The pixels in the block are then classified as being closer to the minimum value or being closer to the maximum value:

if($distToMin_{ij}<distToMax_{ij}$)

$c_{ij}=0_{bin}$ else $c_{ij}=1_{bin}$

Thereafter the number of ones and zeros of the classification parameters $c_{ij}$ in the block are calculated and tested if any is above a defined threshold value, such as 75% of all pixels. In such a case, if the number of zeros among the classification parameter is more than this threshold number the property values are distributed mostly near the minimum value. The largest property value of the pixels classified as $c_{ij}=0$ is then identified. The step size in the interval from the minimum value to the identified largest value of the "min values" is decreased, such as by increasing bits(noOfOffset) by one for this interval and decreasing bits(noOfOffset) by one for the other interval.

Correspondingly, if more than the threshold number of property values is distributed mostly near the maximum value, the smallest value of the pixels classified as $c_{ij}=1$ is identified. The step size in the interval from the identified smallest value of the "max values" to the maximum value is decreased, such as by increasing bits(noOfOffset) by one for this interval and decreasing bits(noOfOffset) by one for the other interval.

Whether the current block is according to one of these modes or none of them, i.e. uniform quantization in the whole interval, can be signaled bit a mode identifier. For instance, $00_{bin}$ signals uniform quantization, $01_{bin}$ signals decreased quantization close to minimum value, $10_{bin}$ indicates decreased quantization close to maximum value. The minimum of the max values need to be stored in mode $10_{bin}$ and the maximum of the min values is stored in the candidate compressed block in mode $01_{bin}$. The remaining mode identifier value $11_{bin}$ can be used for introducing a further mode, such as when most of the property values are distributed around the mid point of the interval.

An alternative approach is to identify the minimum property value in step S50. A representation of the maximum value is determined as an offset relative the minimum value so that the maximum value is approximated by $p_{min}=2^x$, where x is the offset value determined in step S50. The candidate compressed block then comprises a representation of the offset and the minimum value. Intermediate values are then defined in the interval between the approximation and the minimum value, such as described above, i.e. using uniform or non-uniform distribution of quantization levels.

The above-described quantization embodiments should merely be seen as illustrative but preferred quantization techniques that can be used according to the invention. Other known quantization protocols in the art can likewise be used and are within the scope of the invention.

Figure 8:
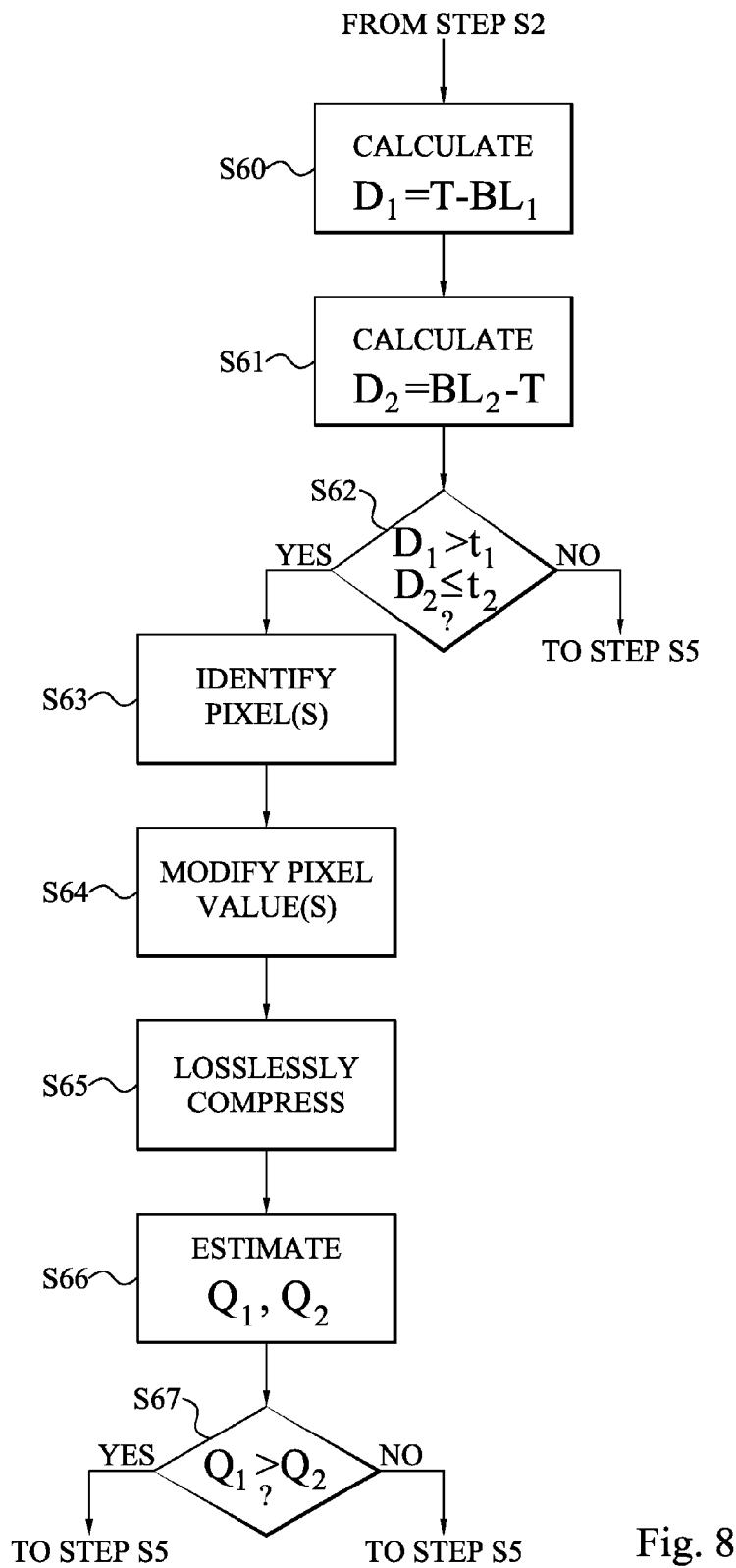
FIG. 8 is a flow diagram illustrating additional, optional steps of the compressing method in FIG. 1.

In some cases, the candidate compressed block that has the bit length size that is closest to the target bit length but does not exceed the target bit length has rather low quality. For instance, assume that the quantization is performed by shifting the property values and that a shift parameter of three gives bit length of 254 bits, when the target bit length is 252 bits. However, the next larger shift parameter, four, could perhaps result in a bit length of merely 200 bits, thus, significantly lower than the target bit length. This means that the candidate compressed block having length of 200 bits has generally much lower quality, e.g. as measured as peak signal to noise ratio (PSNR), than the candidate compressed block of length 254 bits. In such a case it might be more advantageously from quality point of view, to modify one or more, possibly quantized, property values so that the candidate compressed block will instead have a bit length that is just below the target. Such a procedure is illustrated in FIG. 8.

The method continues from step S2 of FIG. 1. A next step S60 calculates a first difference $D_1$ between the bit length $BL_1$ of a first candidate compressed block having bit length equal to or shorter than the target bit length and the target bit length T, $D_1=T-BL_1$. This first candidate compressed block is preferably the block having the smallest possible quantization and still result in a length that does not exceed the target bit length.

A corresponding difference $D_2$ is calculated in step S61 between the bit length $BL_2$ of a second candidate compressed block and the target bit length T, $D_2=BL_2-T$. This second candidate block has a bit length that exceeds the target bit length and is preferably the candidate block with the largest possible quantization that results in a bit length still exceeding the target bit length.

The first difference is compared to a first threshold difference $t_1$ and the second difference is compared to a second threshold difference $t_2$ in the next step S62. If the length of the first candidate compressed block is much shorter than the target bit length, i.e. $D_1>t_1$, and the length of the second candidate compressed block is not that much longer than the target bit length, i.e. $D_2 \leq t_2$, the method continues to step S63. If, however, these conditions are not met it is highly unlikely that the second compressed block can be modified slightly to provide higher quality than the first compressed block but have a bit length that does not exceed the target bit length. Therefore, the method then continues to step S5, where the first candidate compressed block is used for providing the compressed representation of the current block.

In step S63 at least one pixel of the block is identified, where the quantized property value of this/these pixel(s) will subsequently be modified in the next step S64.

The identifying step S63 could identify one or a subset of the pixels in the block having the largest prediction errors during the lossless compression of the block to give the second compressed block. These property values are likely, although not guaranteed, to produce long coded representations of the block in the compressed block representation. The property values of these pixels are therefore adjusted slightly in step S64 so that their prediction errors become shorter and therefore, preferably, the coded errors after entropy encoding also become shorter. This embodiment does not require any entropy encoding of the property values in order to identify the pixel or subset of pixels to modify. However, a disadvantage is that a large prediction error does not necessarily result in long codes. As a consequence, non-optimal pixels may be identified in step S63 for the purpose of reducing the total length of the candidate compressed block.

In another embodiment, step S63 identifies one pixel or a subset of the pixels in the block having the longest residual bit lengths in the second compressed representation. This embodiment is more advantageous as it actually identifies the one pixel or subset of pixels that contributes the most to the total length of the candidate compressed block. A disadvantage is that entropy encoding is required for the purpose of identifying the pixel(s) in step S63.

The quantized property value of the identified pixel(s) is preferably changed to a new value that results in a residual bit length following entropy encoding that is at least one bit shorter than the unmodified value would have given. Since a change in a property value influences all values predicted from it, it could be preferred to limit the identification of pixel, the property values of which to modify, among those pixels that are not predicted from. This can be determined through the relative positions of the pixels and the usage of guiding bits, depending on the particular predictor employed.

The identification and modification of step S63 and S64 can be performed multiple times or once. In the former case, a first pixel is identified and modified in the first round. Thereafter, the pixel block is losslessly compressed in step S65 using the modified value and its bit length is determined and compared to the target bit length. If it still exceeds the target bit length, a second pixel can be identified and its property value is modified in the second round of steps S63 and S64 and so on until the bit length is equal to or lower than the target bit length.

Once the block has been losslessly compressed in step S65 to a bit rate below the target bit rate, a quality parameter is calculated for this candidate compressed block. A corresponding quality parameter is also calculated for the first candidate compressed block, i.e. the one having the smallest possible quantization but still results in a bit length that does not exceed the target bit length. The quality parameters are representative of the image quality in representing the original pixel block with either of the two candidate compressed versions. An example of a suitable quality parameter is mPSNR [1].

The next step S67 selects the candidate compressed block resulting in the highest quality. This selected candidate compressed block is then used for providing the compressed representation of the pixel block in step S5 of FIG. 1.

FIG. 9 is a schematic overview of a compressed representation 400 of a pixel block according to an embodiment. The representation 400 comprises an identifier 410 of the quantization parameter used for generating the candidate compressed block on which the compressed representation 400 is based. This identifier 410 could signal that the candidate compressed block has been losslessly compressed, i.e. no quantization, or that quantization has been used, basically resulting in a lossy representation of the block. The quantization identifier 410 could be an identifier associated with a particular quantization value, such as in the form of a table index. Alternatively, the identifier 410 may indeed include the code of the particular quantization parameter itself.

The compressed representation 400 also comprises the code or representation of the selected candidate compressed block 420 as previously described. The actual order of the included elements 410, 420 of the compressed block representation 400 must not necessarily by as illustrated in FIG. 9.

Note that a variable number of bits can be used for the quantization identifier 410 and therefore also for the selected candidate compressed block 420. The important feature here is that the sum of the bits for the identifier 410 and the candidate compressed block 420 is equal to or below the maximum allowed bit length.

Decompression

Figure 11:
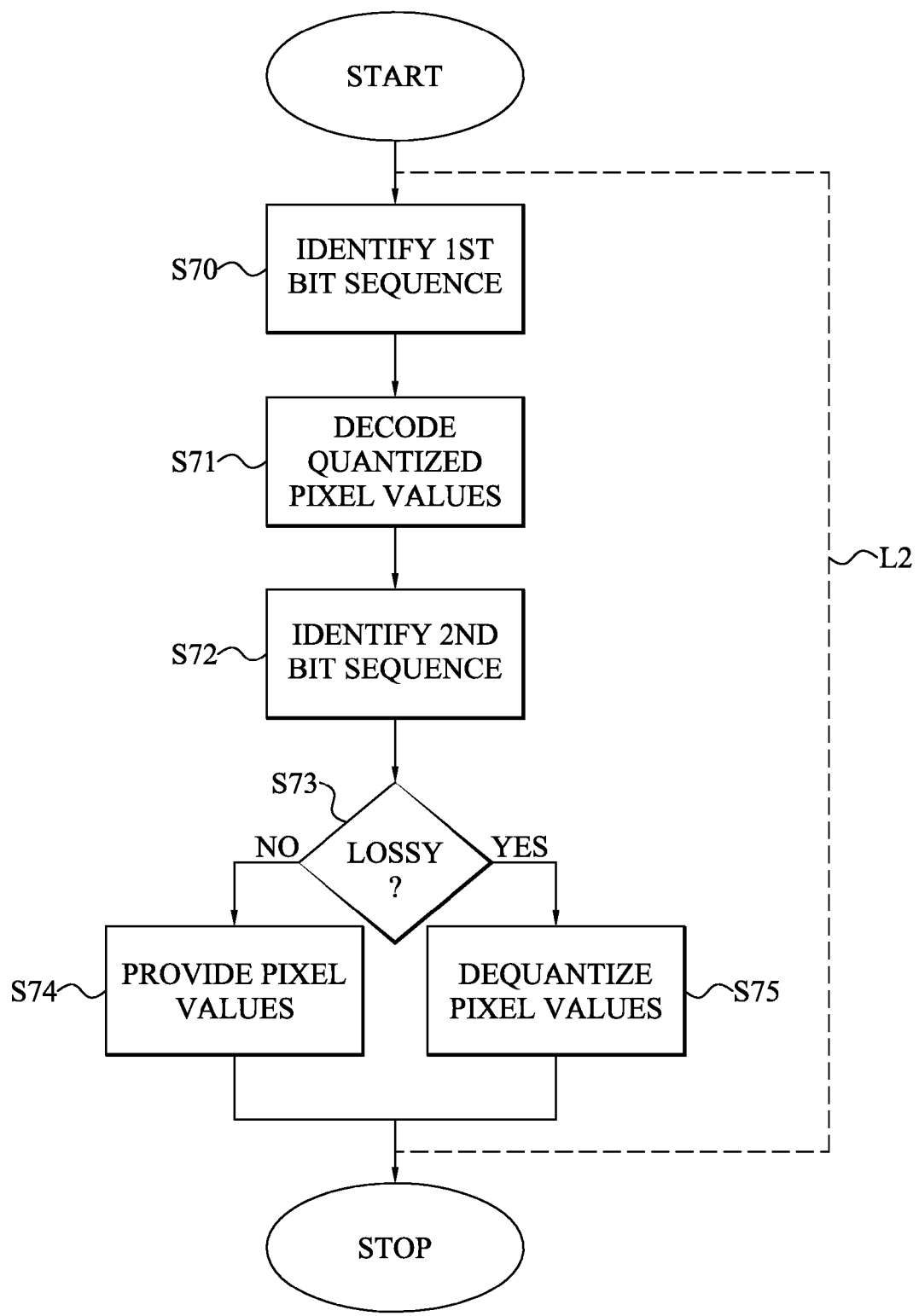
FIG. 11 is a flow diagram illustrating a decompressing method according to an embodiment.

FIG. 11 is an illustration of a flow diagram showing a method of decompressing or decoding a compressed or coded pixel block according to the present invention. The method starts in step S70, where a first bit sequence of the compressed pixel block is identified and retrieved. This first bit sequence comprises the bits of the encoded representation of the (quantized) pixel property values of the block. In other words, the sequence corresponds to the candidate compressed block selected for the current block during compression.

A next step S71 decodes at least one pixel of the pixel block based on the identified and retrieved bit sequence. The particular decoding algorithm employed in step S71 is dictated by the particular lossless compression algorithm utilized when encoding the pixel block. Generally, the operation of the decoding or decompressing algorithm could be regarded as the inverse of the operations of the encoding or compressing algorithm. The result of the decoding is a quantized representation of the original property value for at least one pixel in the block. Step S71 can involve merely decoding a single pixel to get its quantized property value. Alternatively, multiple pixels can be decoded, possibly all pixels in the block.

The next step S72 identifies a second, preferably remaining, sequence of the compressed pixel block. This second sequence comprises the bit sequence of an identifier of a quantization parameter employed for generating the selected candidate compressed block included in the first bit sequence. As was mentioned above, the second bit sequence can indeed include the code for the particular quantization parameter or the code for an identifier, which is employed for providing the relevant quantization parameter, e.g. from a table listing multiple available quantization parameters.

The provided quantization parameter from step S72 is then utilized in a next step S73 for the purpose of determining whether the pixel block was losslessly compressed, i.e. without any quantization, or if quantization was indeed utilized in order to reach the bit budget and therefore the compressed pixel block of the first bit sequence is a lossy representation of the original pixel property values. The determination of step S73 is performed based on the actual value of the quantization parameter. Thus, at least one of the possible values that the quantization parameter or identifier can have is dedicated for representing lossless compression without any quantization of the pixel property values or representing a dummy quantization, such as multiplication by one.

If the provided parameter indicates that such lossless compression has been performed without any quantization for the current block, the method continues to step S74. Step S74 provides the property value(s) of the at least one pixel decoded in step S71 based on the decoded representation of the quantized property values. Thus, in this case no dequantization is required but the decoded value can be used directly as decoded pixel property value, though possibly following a transform into another color space.

As an alternative, it is possible to perform dummy dequantization, e.g. multiplication with 1, even if the compression is lossless. This may be faster in some circumstances, for example in architectures where if-statements are very expensive but raw computations are cheap. In this case steps S73 and S74 are omitted and the method continues directly from step S72 to S75.

However, if the provided quantization parameter instead has a value that indicates that quantization was performed during the compression and therefore that the pixel block was lossy processed even though a lossless compression algorithm was used, as the quantization introduces approximation and is therefore lossy, the method instead continues to step S75. In step S75 the at least one decoded quantized property value from step S71 is first dequantized using the provided quantization parameter. The result after dequantization is the final decoded representation of the pixel property value, which, though, may be further processed, such as input to a color transform.

Once the required number of pixels has been decoded and its/their property value(s) provided in step S74 or S75, the method ends or returns to step S70 for decoding yet another compressed pixel block, which is schematically illustrated by the line L2. If more than one pixel is to be decoded, it may be more efficient to first decode the quantized property values for all these pixels, and then dequantize them.

FIG. 5 is a flow diagram illustrating a particular embodiment of the dequantizating step S75 of FIG. 11. The method continues from step S73 of FIG. 11. In this embodiment, the quantization parameter is a shift parameter. In such a case, the decoded and quantized pixel property value is shifted bitwise to the left a number of steps defined by the shift parameter, i.e. $p_{ij} = p_{ij}^q << s$.

In an alternative embodiment, the decoded and still quantized property value bit sequence of is first shifted one step and then $1_{bin}$ is added or OR:ed to the shifted bit sequence, followed by shifting the remaining s-1 steps. This has the effect of adding half a quantization step to the data, which is the expected value of the quantized value, if the value was quantized by shifting right without rounding.

Another embodiment of the dequantizing step is illustrated in FIG. 12. The method continues from step S73 of FIG. 11. The next step S80 multiples the decoded and quantized property value with the provided quantization parameter to get the representation of the original pixel property value.

An alternative implementation first adds a value of 0.5 to the decoded and quantized property value in order to get a correct expected value of the decoded and quantized property value. The reason for this and the corresponding addition of 1 in the shift embodiment is that all values within the interval of for instance 9.000 and 9.999 is rounded, when using the floor function, to 9. The expected value is therefore 9.5. However, if the round function was used instead of floor, no addition of 0.5 is required.

FIG. 13 is a flow diagram illustrating a further embodiment of the dequantizing step that can be used according to the invention. The method continues from step S73 of FIG. 11. A next step S90 provides a minimum pixel property value and a maximum property value for the pixel block. This value provision is furthermore performed based on the quantization parameter identifier included in the compressed block. In such a case, the second bit sequence of the compressed block can comprise encoded representations of the minimum and maximum values. Alternatively, only one of the minimum/maximum values is provided based on the second bit sequence. The other extreme value is then calculated based on an offset value also included in the second bit sequence.

Multiple intermediate values are calculated as different linear combinations of the minimum and maximum values in step S91. In this embodiment, the quantized pixel property values decoded for the pixels to decompress are used as value indices to one of the property values of the minimum, intermediate and maximum values. Therefore, a correct dequantized and decoded property value of a pixel is identified in step S92 among these minimum, intermediate and maximum values based on the value index assigned to the pixel during compression as discussed above in connection with FIG. 7.

Figure 14:
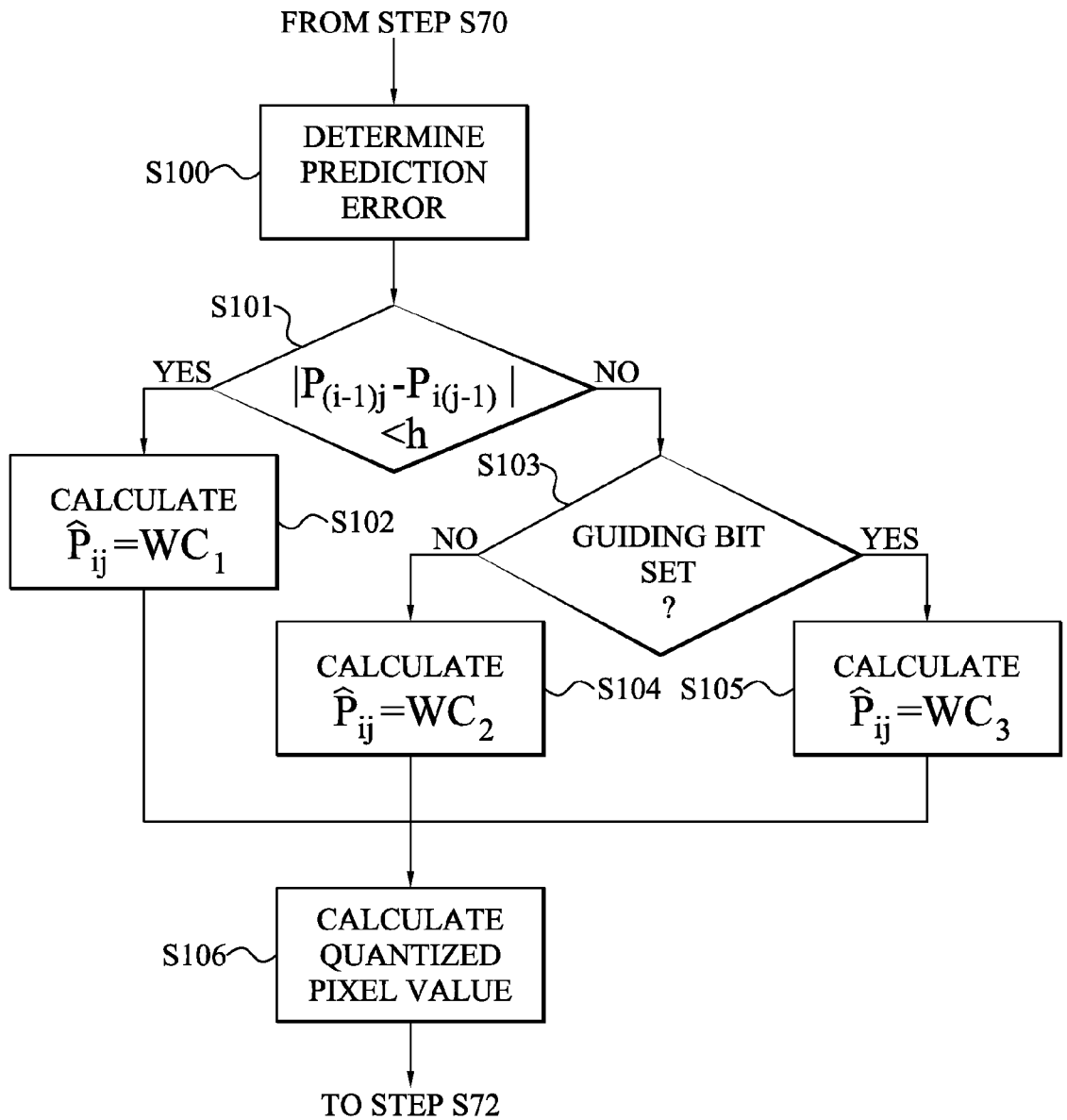
FIG. 14 is a flow diagram illustrating an embodiment of the decoding step of the decompressing method in FIG. 11.

FIG. 14 is a flow diagram illustrating a particular embodiment of decoding the, possibly quantized, property values in the decompression method of FIG. 11. The method continues from step S70 of FIG. 11. Preferably, the property value, such as red color component, of the start pixel in block is provided based on a representation of the start property value included in the first bit sequence of the compressed block representation. In a preferred embodiment, the start property value is provided in uncoded form in the compressed pixel block and can therefore be assigned directly as red color component of the start pixel. This pixel has a predefined position in the block as previously discussed, preferably at (i,j)=(1,1).

Thereafter, a prediction for a next pixel in the same pixel row or column as the start pixel is provided. In this embodiment, the red color component of the start pixel, i.e. the start property value, is used as prediction for the neighboring pixel. The color component of the pixel is then determined based on this component prediction and a prediction error determined for the pixel based on the first bit sequence. This procedure is repeated for the remaining pixels in the pixel row or column comprising the start pixel. However, for these other pixels, the prediction is not necessarily the red color component of the start pixel but in clear contrast equal to the red color component of the most previous neighboring pixel in the same row or column as the current pixel. The property values, e.g. red color components, of the pixels in the first column and row have now been decoded and the method continues with the remaining pixels in the block.

In step S100 a prediction error is determined for a pixel of the block to be decoded. This prediction error is determined based on an encoded error representation associated with the pixel and included in the compressed block. Step S100 therefore involves utilizing the encoded error representation for calculating the pixel prediction error.

The prediction error is preferably performed by Golomb-Rice, or Hoffman or Tunstall, for instance, decoding the encoded representation of the prediction error. In such a case, the prediction error preferably comprises a unary coded quotient, a remainder and an exponent value k. The quotient can be obtained from the unary coded data using Table 1 above. Thereafter, the quotient and remainder forms a value that is multiplied by $2^k$ to form the prediction error.

A prediction of a red, i.e. first, color component of the pixel is determined. The prediction determination involves calculating a difference between the red color components of two neighboring pixels in the block. These two pixels are adjacent pixels of different prediction directions in the block and preferably are positioned at a previous pixel position in the same row or column in the block as the current pixel to be decoded. The difference is preferably the absolute difference or the squared difference to only provide a magnitude representation of the difference irrespective of the sign. The difference is compared with a predefined threshold in step S101. If the difference is smaller than the threshold, the color component prediction is performed according to step S102 otherwise the method continues to step S103.

Step S102 calculates the component prediction from the red color components of the two neighboring pixels in the block and which were employed for calculating the difference used in the comparison of step S101. The component prediction is preferably calculated based on a first weighted combination with non-zero weights, preferably an average of the two red color components as discussed in connection with step S21 of FIG. 4.

If the difference is not smaller than the threshold as determined in step S101, step S103 investigates the value of a guiding bit associated with the coded pixel and included in the compressed pixel block. If the guiding bit has a first bit value, such as $0_{bin}$, the method continues to step S104. However, if the guiding bit instead has a second bit value, such as $1_{bin}$, the prediction provision is conducted according to step S105. Step S104 involves calculating the color component prediction to be based on, preferably equal to, a second weighted combination of the red color components of the two neighboring pixels in the block. Step S105 correspondingly involves calculating a third weighted combination of the red color components of the neighboring pixels in the block as component prediction for the pixel. This means that in this case the guiding bit included in the block for the current pixel dictates which of the two possible candidate predictions that is to be used for the pixel. The operation of these steps S104 and S105 is similar to the steps S23 and S24 of FIG. 4.

Finally, step S106 calculates a quantized representation of the red color component of the pixel based on the prediction error determined in step S100 and the component prediction provided in step S102, S104 or S105. This calculation is preferably implemented by adding the determined prediction error to the component prediction to get the red color component of the partly decoded pixel.

The remaining green and blue color components are preferably decoded following provision of the red component. First, a second prediction error for a pixel to be decoded is determined. The prediction error of the green component is determined similar to the first, e.g. red, prediction error discussed in connection with step S100. In other words, the prediction error is determined based on an encoded representation included in the compressed pixel block. This means that the encoded representation preferably comprises a unary coded quotient, a remainder and an exponent value k. The prediction error determination therefore preferably involves Golomb-Rice, Hoffman or Tunstall decoding of the encoded representation.

Thereafter the prediction of the green or second color component is determined for the pixel. Firstly, the difference between red color components of the two previous neighboring pixels is determined in step S101 and utilized to determine whether the prediction provision is to be conducted according to step S102 or according to one of step S104 and S105.

If the absolute or squared difference is smaller than the threshold in step S101, step S102 calculates the prediction from a first weighted combination, using non-zero weights, of a first difference between the green and red color component of the first neighboring pixel and a second difference between the green and red color components of the second neighboring pixel. The calculation preferably determines an average of the two differences and the prediction is preferably determined based thereon, preferably set equal to the average $$G_{ij} \triangleq R_{ij} = \frac{(G_{(i-1)j} - R_{(i-1)j}) + (G_{i(j-1)} - R_{i(j-1)})}{2}$$

or $$G_{ij} \triangleq R_{ij} = \left\lfloor \frac{(G_{(i-1)j} - R_{(i-1)j}) + (G_{i(j-1)} - R_{i(j-1)})}{2} \right\rfloor.$$

If the absolute or square difference exceeds the threshold in step S101, the method continues to step S103, which uses the guiding bit to select which of two possible candidate predictions to use for the current pixel. If the guiding bit has a first value the method continues to step S104, where the prediction is selected to be based on or equal to the second weighted combination of the differences between green and red color components of the neighboring pixels. However, if the guiding bit has a second value, the third weighted combination of the differences between the green and red color components of the two neighboring pixels is instead selected in step S105.

The method then continues to step S106, where a representation of the green color component of the pixel is determined based on the prediction error determined in step S100 and the component prediction provided in step S102, S104 or S105. This step S106 preferably involves adding the prediction to the prediction error to get a difference between the green and red color components of the pixel. The green color component can then be determined by simply adding the previously determined red color component.

In order to decode the blue or third component, the procedure described above is repeated. However, in this case the difference between the blue and green color components or between the blue and red components is handled instead of the difference between the green and red components.

Compressor

Figure 15:
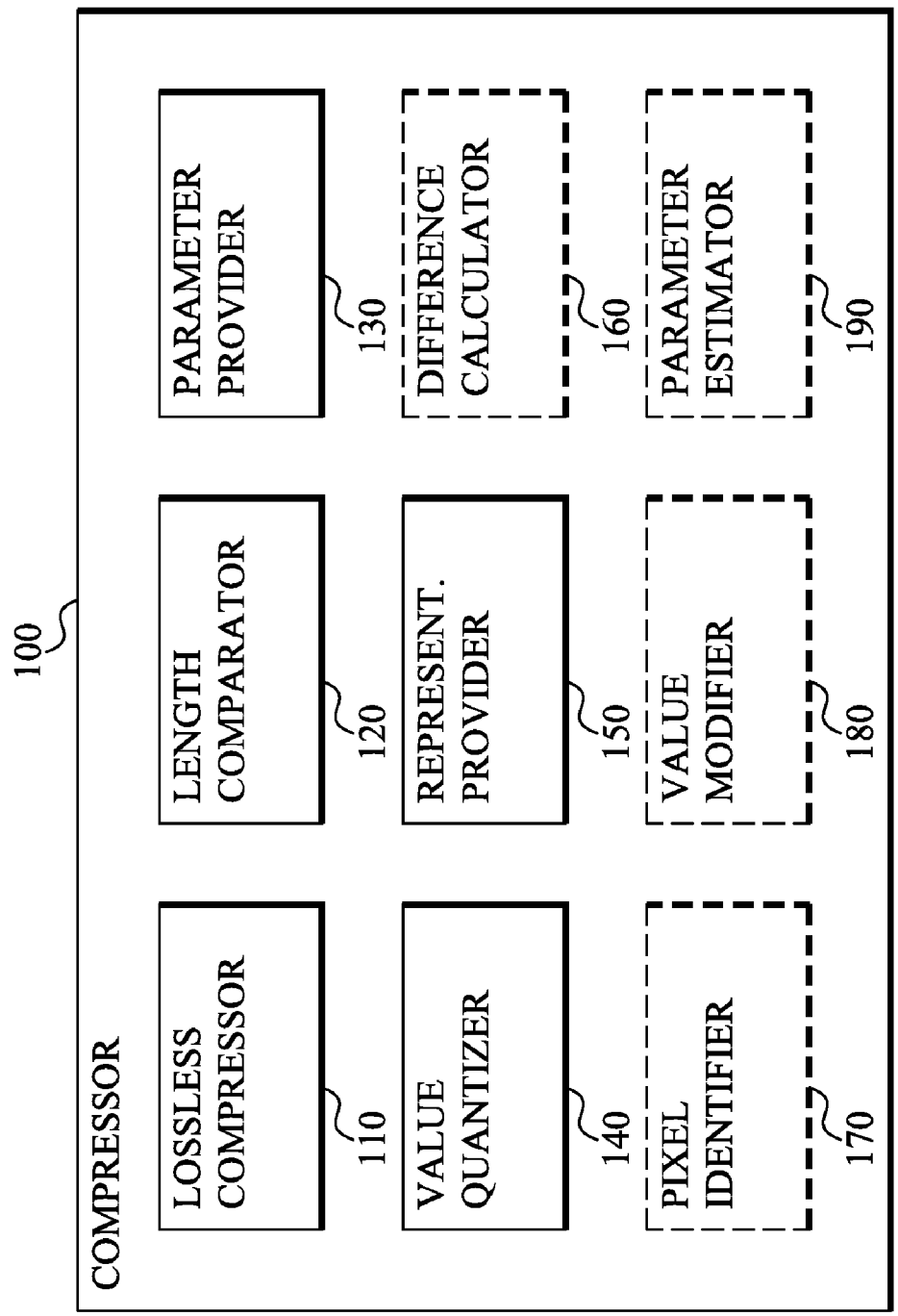
FIG. 15 is a schematic block diagram of a compressor according to an embodiment.

FIG. 15 is a schematic block diagram of a compressor 100 according to an embodiment. The compressor 100 comprises a lossless compressor 110 for losslessly compressing pixel property values of pixels in a block to get a candidate compressed representation of the block.

A connected length comparator 120 is provided for comparing a bit length of the candidate compressed block from the lossless compressor 110 with a target bit length. If the resulting bit length is equal to or smaller than the target bit length, a parameter provider 130 preferably determines a quantization parameter that indicates that the pixel block has been losslessly compressed without any lossy quantization. A representation provider 150 determines a resulting compressed representation of the block as comprising the candidate compressed block from the lossless compressor 110 and the quantization parameter from the parameter provider 130.

However, if the bit length of the candidate compressed block exceeds the target bit length as determined by the length comparator 120, a value quantizer 140 is operated to quantize the pixel property values of the block based on a quantization parameter from the parameter provider 130. The output from this value quantization is a set of multiple quantized property values that are input to and processed by the lossless compressor 110. The compressor 110 determines a new candidate compressed block, though, using the quantized values instead of the original pixel property values. The length of this new candidate compressed block is compared by the comparator 120 with the target bit length. If the length meets the bit budget, the representation provider 150 determines the compressed block representation based on the bit sequence of the candidate compressed block and the bit sequence of an identifier of the quantization parameter. However, if the bit length still exceeds the target bit length, the parameter provider 130 provides a new quantization parameter or the previously used parameter. The quantizer 140 quantizes the pixel property values with the quantization parameter and a new round of lossless compression is conducted.

In a preferred embodiment, the compressor 100 allows determination of the candidate compressed block that has the longest possible bit length but still has a total length that does not exceed the bit budget. This in turn corresponds to using the smallest possible quantization of the property values that is required to get as close as possible to but not exceeding the target bit length.

FIG. 16 is a schematic block diagram of a particular implementation of the lossless compressor 110 of FIG. 15. In this implementation, the compressor 110 comprises a prediction determiner 112 for determining respective predictions of pixel property values of at least a portion of the multiple pixels in the block. The prediction determiner 112 preferably calculates the prediction to be based on weighted combinations of one or more neighboring pixels in one or more prediction directions in the block relative a current pixel to be encoded.

An error calculator 114 uses the prediction from the prediction determiner 112 to calculate a prediction error for a pixel, preferably as the difference between the original or quantized property value and its determined prediction. The prediction error is then encoded using a connected entropy encoder 116. This entropy encoder 116 could for instance be a Golomb-Rice encoder, a Huffman encoder, a Tunstall encoder or indeed any other entropy encoder known in the art.

The units 112 to 116 of the lossless compressor 110 may be provided as software, hardware or a combination thereof. The units 112 to 116 may be implemented together in the lossless compressor 110. Alternatively, a distributed implementation is also possible with some of the units provided elsewhere in the compressor.

FIG. 17 is a schematic block diagram illustrating an embodiment of the prediction determiner 112 in FIG. 16. The lossless compressor is preferably arranged for selecting a start property value for the block to be compressed.

In an embodiment, this start property value is the red color component of a selected pixel in the block. This pixel preferably has a predefined pixel position in the block and is preferably the upper left pixel. The compressed block representation comprises a representation of the start property value.

The prediction determiner 112 is arranged for providing predictions for pixels present in the same row and column as the start pixel, preferably the first row and column. For these pixels, the respective predictions are selected to be based on the red color component, in the case of first prediction, the difference between the green and red color components, in the case of second prediction, or the difference between the blue and green color components or the blue and red color components, in the case of third prediction, of the pixel having the immediate preceding position towards the start pixel in the same row or column as the current pixel.

The prediction determiner 112 comprises a prediction calculator 111 for calculating a difference between the red color components of two neighboring pixels positioned adjacent to the current pixel but at previous positions in the same pixel column or pixel row in the block. The particular predictions to select for the remaining pixels are then determined at least partly based on this difference.

If the absolute value of the difference or the squared difference is smaller than a predefined threshold value as determined by a value comparator 117, the prediction calculator 111 calculates the color component prediction of the pixel based on a first weighted combination of the red color components of the two neighboring pixels. The prediction calculator 111 preferably determines an average of these two neighboring red color components. The prediction is then calculated from the average, possibly utilizing further color components of pixels in the block, but is preferably equal to the average.

However, if the difference is not smaller than the threshold, a prediction selector 113 of the determiner 112 is activated. This prediction selector 113 selects one of a second weighted combination and a third different weighted combination of the red color components of the two neighboring pixels as prediction for the pixel. The prediction selector 113 is preferably also configured for calculating the respective second and third weighted combinations of the red color components.

In a preferred embodiment, the prediction selector 113 calculates, if the difference $|R_{(i-1)j}-R_{i(j-1)}|$ is not smaller than the threshold as determined by the value comparator 117, a first difference between the second weighted combination of the red color components of the two neighboring pixels and the current pixel and a second difference between the third weighted combination of the red color components of the neighboring pixels and the current pixel. The prediction selector 113 uses these two calculated differences for selecting the prediction of the red color component of the current pixel. Generally, the selector 113 selects the one of the second and third weighted combination that results in the smallest difference, in terms of magnitude, of the first and second differences.

A guiding bit provider 115 is arranged functionally connected to the prediction selector 113. The provider 115 generates a guiding bit representative of the selected prediction direction and the weighted combination selected by the prediction selector 113 as prediction of the current color component.

The prediction determiner 112 also determines predictions for the green and blue color components. However, when compressing a green or second color component of the pixels, the lossless compressor calculates, for each pixel in the block, a respective difference between the green and red color components of the pixels, $G_{ij}-R_{ij}$.

In such a case, the value comparator 117 investigates whether, for a given pixel, the difference between the red color components of its two neighboring pixels in predefined prediction directions exceed a threshold. If the difference is smaller than the threshold, the prediction calculator 111 calculates a second prediction for the pixel based on a first weighted combination, (preferably employing the same non-zero weights as the first weighted combination of the red color components, of a first difference between the green and red color components of the first neighboring pixel and a second difference between the green and red color components of the second neighboring pixel. In a preferred embodiment, the second prediction is calculated based on, and more preferably equal to, the average of the first and second differences.

If the difference instead exceeds the threshold, the prediction selector 113 selects one of the second and third weighted combinations, preferably employing the same weights as the respective second and third weighted combinations of the red color components, of the first and second differences, $G_{(i-1)j}-R_{(i-1)j}$ or $G_{i(j-1)}-R_{i(j-1)}$, as second prediction for the current pixel. The prediction selector 113 preferably uses the previously determined guiding bit assigned to the pixel for selecting which of these two weighted combinations to use as second prediction. Alternatively, the difference calculator can anew calculate the differences $R_{ij}-WC_2$ and $R_{ij}-WC_3$ and select second prediction based thereon.

The lossless compressor preferably also calculates a difference between the blue and green color components $B_{ij}-G_{ij}$, or between the blue and red components, of the pixels in the block. These differences are then processed in a similar way as described above in order to provide a blue color component prediction and a third encoded prediction error representation for the pixel.

The units 111 to 117 of the prediction determiner 112 may be provided as software, hardware or a combination thereof. The units 111 to 117 may be implemented together in the prediction determiner 112. Alternatively, a distributed implementation is also possible with some of the units provided elsewhere in the lossless compressor.

FIG. 18 is a schematic block diagram of an embodiment of the value quantizer 140 of the compressor. In this embodiment, the quantizer 140 comprises a pattern shifter 142 arranged for bitwise shifting the bit pattern of a pixel property value a number of steps to the right, where this number of steps is defined by the quantization parameter. The bit-shifted value corresponds to a quantized version of the property value.

The unit 142 of the value quantizer 140 may be provided as software, hardware or a combination thereof. The unit 142 may be implemented in the value quantizer 140 or elsewhere in the compressor.

FIG. 19 is schematic block diagram of another embodiment of the value quantizer 140 of the compressor. In this embodiment, the quantizer 140 comprises a divider 144 for dividing a property value with the quantization parameter or a value determined based on the quantization parameter. The resulting quotient is then rounded by a value rounder 146 according to the ceiling, floor or round function to get a quantized pixel property value.

The units 144 and 146 of the value quantizer 140 may be provided as software, hardware or a combination thereof. The units 144 and 146 may be implemented together in the value quantizer 140. Alternatively, a distributed implementation is also possible with some of the units provided elsewhere in the compressor.

FIG. 20 is a schematic block diagram of an embodiment of the value quantizer 140 of the compressor. In this embodiment, the quantizer 140 comprises a value identifier 141 for identifying a smallest pixel property value and a largest pixel property value in the input pixel block. A value definer 143 defines intermediate values as linear combinations of the minimum and maximum values. A quantized property value is then defined as the value of the minimum, intermediate and maximum value that is closest to an original property value of a pixel. A value identifier of this value selected for the current pixel is provided and assigned to the pixel as previously described. The quantization parameter comprises, in this embodiment, representations of the minimum and maximum values as previously described. The candidate compressed block can comprise an encoded sequence of the value identifiers assigned to the pixels and associated with any of the minimum, intermediate and maximum value. In a preferred embodiment, the lossless compressor performs a prediction-based compression utilizing the assigned value indices as input to thereby reduce the number of bits required for representing the value indices and the compressed pixel block.

The units 141 and 143 of the value quantizer 140 may be provided as software, hardware or a combination thereof. The units 141 and 143 may be implemented together in the value quantizer 140. Alternatively, a distributed implementation is also possible with some of the units provided elsewhere in the compressor.

In a preferred embodiment, the compressor 100 of FIG. 15 comprises a difference calculator 160. This calculator 160 calculates a first difference between the bit length of a first candidate compressed block and the target bit length. The property values of this first candidate block have preferably been quantized by the quantizer 140 using the smallest possible quantization but still result in a length of the first candidate block that does not exceed the target bit length.

The calculator 160 also calculates a second difference between the bit length of a second candidate compressed block and the target bit length. The property values of the second candidate block have preferably been quantized by the quantizer 140 using the largest possible quantization giving a total length of the second block that exceeds the target bit length.

If the first difference exceeds a first threshold value but the second difference does not exceed a second threshold value, a pixel identifier 170 of the compressor 100 identifies at least one pixel of the block. The identifier 170 preferably identifies the L pixels in the block having the L largest prediction errors as determined by the lossless compressor 110, where $1 \leq L < N \times M$ and $N \times M$ represents the number of pixels in the block. Alternatively, the identifier 170 identifies the L pixels in the block having the L longest residual bit lengths of the candidate compressed block.

A value modifier 180 is configured for modifying the property value of the identified L pixels to thereby get a quantized, modified pixel property value. The lossless compressor 110 compresses the block again but replacing the previous quantized property value of the identified pixel positions with the modified, quantized property values to thereby get a third candidate compressed block. The modification performed by the modifier 180 adjusts the property value of the particular pixel(s) so that the resulting code coming from the entropy encoder, constituting the third candidate compressed block, will be shorter as compared to the situation before the value modification, i.e. being shorter than the bit length of the second candidate compressed. As a consequence, the bit length of the third candidate compressed block is now equal to or shorter than the target bit length.

A parameter estimator 190 estimates a respective quality parameter for the first compressed block and the candidate compressed block having at least one modified quantized property value. The candidate block resulting in highest image quality, i.e. is the best representative as determined by the quality parameter of the original pixel block, is selected and used by representation provider 150 for determined the compressed representation of the current pixel block.

The units 110 to 190 of the compressor 100 may be provided as software, hardware or a combination thereof. The units 110 to 190 may be implemented together in the compressor 100. Alternatively, a distributed implementation is also possible. The compressor 100 is preferably implemented in a CPU of a computer, mobile telephone, laptop, game console or some other terminal or unit having the need for compressing images and textures.

Decompressor

FIG. 21 is a block diagram of an embodiment of a decompressor 200 for decompressing a compressed pixel block. The decompressor 200 comprises a first sequence identifier 210 for identifying a first bit sequence of a compressed pixel block. This first bit sequence corresponds to the encoded representation of the possibly quantized pixel property values of the block.

A decoder 230 processes the identified first bit sequence and decodes it for the purpose of providing a possibly quantized pixel property value for at least one of the pixels in the block.

The decompressor 200 also comprises a second sequence identifier 220 for identifying a second bit sequence of the compressed block. This second bit sequence allows identification of a quantization parameter utilized in connection with the compression of the block.

A representation provider 240 is adapted to operate if the quantization parameter indicates that the compressed block has been losslessly compressed without any lossy quantization. The provider 240 then determines a representation of the property value of at least one pixel based on the decoded property value from the decoder 230.

However, if the quantization parameter instead indicates that a lossy quantization has been performed during the block compression, a representation determiner 250 dequantizes the property value from the decoder 230 using the provided quantization parameter. The dequantized value is then used as representation of the original property value of the pixel. Dequantization with a dummy parameter is possible even though no lossy quantization has been performed for the block during the compression.

The units 210 to 250 of the decompressor 200 may be provided as software, hardware or a combination thereof. The units 210 to 250 may be implemented together in the decompressor 200. Alternatively, a distributed implementation is also possible. The decompressor 200 is preferably implemented in a GPU of a computer, mobile telephone, laptop, game console or some other terminal or unit having the need for decompressing images and textures.

FIG. 22 is a schematic block diagram of an embodiment of the representation determiner 250 of the decompressor. In this embodiment, the determiner 250 comprises a pattern shifter 252 implemented for shifting the bit pattern of a decoded property value s steps to the left to get the dequantized property value. In this case, the shift number s corresponds to the quantization parameter.

The unit 252 of the representation determiner 250 may be provided as software, hardware or a combination thereof. The unit 252 may be implemented in the representation determiner 250. Alternatively, a distributed implementation is also possible with the unit provided elsewhere in the decompressor.

FIG. 23 is an illustration of another embodiment of the representation determiner 250. In this embodiment, the determiner 250 comprises a multiplier 254 arranged for multiplying the decoded property value with the quantization parameter or a value calculated based on the quantization parameter to get the dequantized property value.

The unit 254 of the representation determiner 250 may be provided as software, hardware or a combination thereof. The unit 254 may be implemented in the representation determiner 250. Alternatively, a distributed implementation is also possible with the unit provided elsewhere in the decompressor.

A further embodiment of the representation determiner 250 is illustrated in the schematic block diagram of FIG. 24. A value provider 251 of the determiner 250 provides a minimum and maximum property value for the block based on the identifier of the quantization parameter. At least one intermediate value is calculated as linear combination of the maximum and minimum property values by a value calculator 253. The decoded and quantized property value is in this case a value identifier assigned to a pixel, which identifier allows, for the given pixel, identification of a value of the minimum, intermediate and maximum values by a representation identifier 255. The identified value is then assigned as a dequantized property value for the pixel.

The unit 251 to 255 of the representation determiner 250 may be provided as software, hardware or a combination thereof. The units 251 to 255 may be implemented together in the representation determiner 250. Alternatively, a distributed implementation is also possible with some of the units provided elsewhere in the decompressor.

Figure 25:
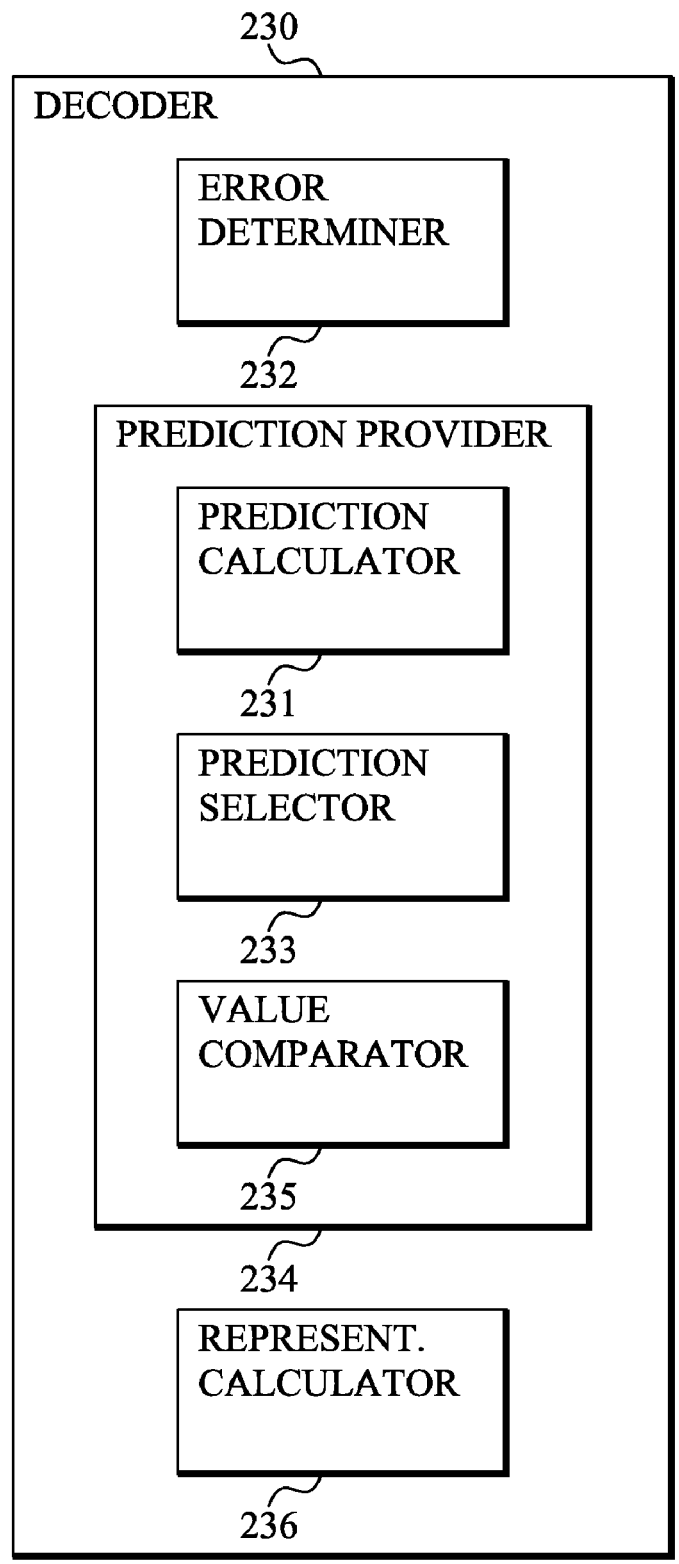
FIG. 25 is a schematic block diagram of an embodiment of the decoder of the decompressor in FIG. 21.

FIG. 25 is a schematic block diagram of an embodiment of a decoder 230 that can be used by the decompressor. The decoder 230 is implemented for providing a start property value, such as red color component, of a start pixel in the block. This component is preferably set equal to the start property value comprised in the compressed pixel block.

A prediction provider 234 preferably provides predictions for pixels in the same row and column as the start pixel by setting the prediction to be equal to the red color component, the difference between the green and red color components and the difference between the blue and green color components of the previous pixel in the row or column.

The decoder 230 comprises an error determiner 232 arranged for determining a prediction error of a pixel to be decoded. This prediction error is determined based on an encoded error representation assigned to the pixel and included in the compressed pixel block.

The prediction provider 234 calculates a difference between the previously decoded red color components of two neighboring pixels present in the same block row and column as the current pixel. This difference or more preferably the absolute value or squared difference is compared to a predefined threshold. If the difference is smaller than the threshold as determined by a value comparator 235, a prediction calculator 231 is activated and calculates the prediction based on a first non-zero weighted combination of these two neighboring color components. As has been discussed above, the calculation is preferably performed based on an average of the two color components.

However, if the difference exceeds the threshold, a prediction selector 233 selects one of the second and third weighted combinations of the previously decoded color components of the neighboring pixels as prediction. This selection is furthermore performed based on the guiding bit assigned to the pixel and included in the compressed pixel block.

A representation calculator 234 uses the prediction error from the error determiner 232 and the prediction from the provider 234 to calculate the red color component of the pixel.

Correspondingly when decoding a green color component of the pixel the error determiner 232 determines a second error prediction for pixel from data contained in the compressed pixel block. The prediction calculator 231 calculates, if the difference between the red color components of the two neighboring pixels is smaller than the threshold, a second prediction based on the first weighted combination of the differences between the previously decoded green and red color components of the two neighboring pixels as previously described. In the other case, i.e. difference exceeds the threshold, the selector 233 uses the guiding bit to select one of the second and third weighted combinations of the differences between the previously decoded green and red color components of the two neighboring pixels as the second prediction.

The representation calculator 236 preferably adds the second prediction error from the determiner 232 to the second prediction from the prediction provider 234. Furthermore, the previously decoded red color component of the pixel is added to the sum to get the decoded green color component. The decoder 230 repeats this procedure for the blue color component by determining a third prediction error and providing a third prediction. The previously decoded green color component is added to these third error and prediction to get the decoded blue color component of the pixel.

The units 231 to 236 of the decoder 230 may be provided as software, hardware or a combination thereof. The units 231 to 236 may be implemented together in the decoder 230. Alternatively, a distributed implementation is also possible with some of the units provided elsewhere in the decompressor.

The algorithm disclosed herein has been tested and compared to the prior art HDR texture processing schemes. In this simple test, the quantization/dequantization was conducted using bitwise shifts with a 4-bit quantization parameter. The target bit length was set to 252, thereby resulting in a total bit rate for the blocks of 256 bits and 16 bits per pixel for a 4×4 pixel block. The lossless compression was conducted as described herein in connection with FIG. 4 and decompression as disclosed in connection with FIG. 14. A single image Memorial was used in the test and two different quality metrics were estimated, HDR-VDP 75% (High Dynamic Range Visual Difference Predictor) (lower value is better) and Multi-exposure PSNR (higher value is better).

TABLE 3

Comparison of quality parameters

| | HDR-VDP 75% | Multi-exposure PSNR |
|---|---|---|
| Wang 16 bit [3] | 15.4% | 38.9 dB |
| Roimela 8 bit [2] | 0.01% | 41.3 dB |
| Munkberg 8 bit [1] | 0.01% | 46.5 dB |
| Invention 16 bit | 0.00% | 56.1 dB |

It will be understood by a person skilled in the art that various modifications and changes may be made to the present invention without departure from the scope thereof, which is defined by the appended claims.

REFERENCES

[1] Munkberg, Clarberg, Hasselgren, and Akenine-Möller, 2006, High dynamic range texture compression for graphics hardware, *ACM Transactions on Graphics*, 25(3): 698-706
[2] Roimela, Aarnio, and Itäranta, 2006, High dynamic range texture compression, *ACM Transactions on Graphics*, 25(3): 707-712
[3] Wang, Wang, Sloan, Wei, Tong and Guo, 2007, Rendering from compressed high dynamic range textures on programmable graphics hardware, Symposium on Interactive 3D Graphics, *Proceeding of the* 2007 symposium on Interactive 3D *graphics and games*, pp. 17-24
[4] Weinberger, Seroussi, Sapiro, 1996, LOCO-I: A low complexity context-based lossless image compression algorithm, In *In Data Compression Conference*, pp. 140-149
[5] Golomb, 1996, Run-length encodings, *IEEE Transactions on Information Theory*, 12(3): 399-401
[6] Rice and Plaunt, 1971, Adaptive variable-length coding for efficient compression of spacecraft television data, *IEEE Transactions on Communications*, 16(9): 889-897
[7] Huffman, 1952, A method for the construction of minimum-redundancy codes, *Proceedings of the I.R.E.*, pp. 1098-1102
[8] Tunstall, 1967, Synthesis of noiseless compression codes, *Ph. D. dissertation*, Georgia Inst. Techn., Atlanta, Ga., USA
[9] Technical Introduction to OpenEXR, 2006, pp. 1-14, www.openexr.com/TechnicalIntroduction.pdf

The invention claimed is:

1. A method of compressing a block of multiple pixels each having a pixel property value, said method comprising the steps of:
 a) losslessly compressing said pixel property values of said multiple pixels to get a candidate compressed block;
 b) comparing a bit length of said candidate compressed block with a target bit length;
 c) providing a quantization parameter;
 d) quantizing, if said bit length exceeds said target bit length, said pixel property values based on said quantization parameter to get quantized pixel property values;
 e) repeating, if said bit length exceeds said target bit length, said losslessly compressing step a) using said quantized pixel property values and said steps b) to d) until said bit length is equal to or shorter than said target bit length; and f) generating a compressed representation of said block comprising the candidate compressed block having a bit length that is equal to or shorter than said target bit length and an identifier of a provided quantization parameter.

2. The method according to claim 1, wherein said losslessly compressing step a) comprises the steps of:
    determining respective predictions of pixel property values of at least a portion of said multiple pixels;
    calculating respective prediction errors for said at least a portion of said multiple pixels based on said respective predictions; and
    entropy encoding said respective prediction errors to get said candidate compressed block.

3. The method according to claim 2, wherein said determining step comprises providing, for each pixel of said at least a portion of said multiple pixels, a prediction of the pixel property value of said pixel by:
    calculating said prediction based on a first weighted combination of a pixel property value of a first neighboring pixel in said block and a pixel property value of a second neighboring pixel in said block employing non-zero weights if a magnitude difference between said pixel property values of said neighboring pixels is smaller than a threshold;
    selecting said prediction to be based on one of a second different, weighted combination of said pixel property values of said neighboring pixels and a third different, weighted combination of said pixel property values of said neighboring pixels if said magnitude difference is not smaller than said threshold; and
    providing a guiding bit associated with said selected one of said second weighted combination and said third weighted combination if said magnitude difference is not smaller than said threshold.

4. The method according to claim 1, wherein said quantizing step d) comprises shifting, if said bit length exceeds said target bit length, the bit patterns of said pixel property values s steps to the right to get said quantized pixel property values, where s represents said quantization parameter.

5. The method according to claim 1, wherein said quantizing step d) comprises the steps of:
    dividing, if said bit length exceeds said target bit length, said pixel property values with said quantization parameter; and
    rounding quotients between said pixel property values and said quantization parameter.

6. The method according to claim 1, wherein said quantization step d) comprises the steps of:
    identifying, if said bit length exceeds said target bit length, a smallest pixel property value and a largest pixel property value of said multiple pixels; and
    defining, based on said quantization parameter, said quantized pixel property values as different linear combinations of said largest pixel property value and said smallest pixel property value.

7. The method according to claim 1, further comprising the steps of:
    calculating a first difference between a bit length of a first candidate compressed block and said target bit length, said bit length of said first candidate compressed block is equal to or shorter than said target bit length and said target bit length;
    calculating a second difference between a bit length of a second candidate compressed block and said target bit length, said bit length of said second candidate compressed block exceeds said target bit length and said second candidate compressed block has a quantization level that is lower than a quantization level of said first candidate compressed block;
    identifying, if said first difference exceeds a first threshold value and said second difference is equal to or smaller than a second threshold value, at least one pixel of said multiple pixels; modifying the quantized pixel property value of said identified at least one pixel;
    losslessly compressing said quantized pixel property values of said multiple pixels following said property value modification to get a third candidate compressed block having a bit length that is equal to or lower than said target bit length;
    estimating a respective quality parameter for said first candidate compressed block and said third candidate compressed block; and
    selecting said compressed representation of said block to be one of said first candidate compressed block and said third candidate compressed block based on said estimated quality parameters.

8. The method according to claim 7, wherein said identifying step comprises identifying, if said first difference exceeds said first threshold value and said second difference is equal to or smaller than said second threshold value, the L pixel(s) of said multiple pixels having the L largest prediction error(s), where $1 \leq L < N \times M$ and $N \times M$ represents the number of pixels in the block.

9. The method according to claim 7, wherein said identifying step comprises identifying, if said first difference exceeds said first threshold value and said second difference is equal to or smaller than said second threshold value, the L pixel(s) of said multiple pixels having the L longest residual bit length(s) of said second candidate compressed block, where $1 \leq L < N \times M$ and $N \times M$ represents the number of pixels in said block.

10. A method of decompressing a compressed pixel block, said method comprising the steps of:
    identifying a first bit sequence of said compressed pixel block corresponding to an encoded representation of pixel property values of multiple pixels in a pixel block;
    decoding said first bit sequence to get a decoded representation of a pixel property value of at least one pixel;
    identifying a second bit sequence of said compressed pixel block corresponding to an identifier of a quantization parameter;
    providing a representation of a pixel property value of said at least one pixel based on said decoded representation of said pixel property value if said quantization parameter indicates that said compressed pixel block has been losslessly compressed; and
    determining said representation of said pixel property value of said at least one pixel based on said decoded representation of said pixel property value and said quantization parameter if said quantization parameter indicates that said compressed pixel block has been lossy quantized during compression of said pixel block.

11. The method according to claim 10, wherein said determining step comprises shifting a bit pattern of said decoded representation of said pixel property value s steps to the left to get said representation of said pixel property value, where s represents said quantization parameter.

12. The method according to claim 10, wherein said determining step comprises multiplying said decoded representation of said pixel property value with said quantization parameter to get said representation of said pixel property value.

13. The method according to claim 10, wherein said determining step comprises the steps of:
- providing, based on said identifier, a minimum pixel property value and a maximum pixel property value of said pixel block;
- calculating multiple pixel property values in as different linear combinations of said largest pixel property value and said smallest pixel property value; and
- identifying said representation of said pixel property value among said smallest pixel property value, said largest pixel property value and said calculated multiple pixel property values based on said decoded representation of said pixel property value.

14. The method according to claim 10, wherein said decoding step comprises the steps of:
- determining, for said at least one pixel, a prediction error based on an encoded error representation associated with said at least one pixel and comprised in said first bit sequence;
- providing a prediction of said decoded representation of said pixel property value by:
  - calculating said prediction based on a first weighted combination of a pixel property value of a first neighboring pixel in said block and a pixel property value of a second neighboring pixel in said block employing non-zero weights if a magnitude difference between said pixel property values of said neighboring pixels is smaller than a threshold; and
  - selecting, if said magnitude difference is not smaller than said threshold, said prediction to be based on one of a second different, weighted combination of said pixel property values of said neighboring pixels and a third different, weighted combination of said pixel property values of said neighboring pixels based on a guiding bit associated with said at least one pixel and comprised in said first bit sequence; and
- calculating said decoded representation of said pixel property value based on said prediction error and said prediction.

15. A compressor for compressing a block of multiple pixels each having a pixel property value, said compressor comprising:
- a lossless compressor for losslessly compressing said pixel property values of said multiple pixels to get a candidate compressed block;
- a length comparator for comparing a bit length of said candidate compressed block with a target bit length;
- a parameter provider for providing a quantization parameter;
- a value quantizer for quantizing, if said bit length exceeds said target bit length as determined by said length comparator, said pixel property values based on said quantization parameter to get quantized pixel property values, wherein said lossless compressor, said length comparator, said parameter provider and said value quantizer are arranged for sequentially losslessly compressing quantized pixel property values, comparing bit lengths, providing quantization parameters and quantizing pixel property values, respectively, until said bit length is equal to or shorter than said target bit length as determined by said length comparator; and
- a representation provider for generating a compressed representation of said block comprising the candidate compressed block having a bit length that is equal to or shorter than said target bit length and an identifier of a provided quantization parameter.

16. The compressor according to claim 15, wherein said lossless compressor comprises:
- a prediction determiner for determining respective predictions of pixel property values of at least a portion of said multiple pixels;
- an error calculator for calculating respective prediction errors for said at least a portion of said multiple pixels based on said respective predictions; and
- an entropy encoder for entropy encoding said respective prediction errors to get said candidate compressed block.

17. The compressor according to claim 16, wherein said prediction determiner comprises:
- a prediction calculator for calculating a prediction for each pixel of said at least a portion of said multiple pixels based on a first weighted combination of a pixel property of a first neighboring pixel in said block and a pixel property value of a second neighboring pixel in said block employing non-zero weights if a magnitude difference between said pixel property values of said neighboring pixels is smaller than a threshold;
- a prediction selector for selecting said prediction to be based on one of a second different, weighted combination of said pixel property values of said neighboring pixels and a third different, weighted combination of said pixel property values of said neighboring pixels if said magnitude difference is not smaller than said threshold; and
- a bit provider for providing a guiding bit associated with said selected one of said second weighted combination and said third weighted combination if said magnitude difference is not smaller than said threshold.

18. The compressor according to claim 15, wherein said value quantizer comprises a pattern shifter for shifting, if said bit length exceeds said target bit length as determined by said length comparator, the bit patterns of said pixel property values s steps to the right to get said quantized pixel property values, where s represents said quantization parameter.

19. The compressor according to claim 15, wherein said value quantizer comprises:
- a divider for dividing, if said bit length exceeds said target bit length as determined by said length comparator, said pixel property values with said quantization parameter; and
- a value rounder for rounding quotients between said pixel property values and said quantization parameter.

20. The compressor according to claim 15, wherein said value quantizer comprises:
- a value identifier for identifying, if said bit length exceeds said target bit length as determined by said length comparator, a smallest pixel property value and a largest pixel property value of said multiple pixels; and
- a value definer for defining, based on said quantization parameter, said quantized pixel property values as different linear combinations of said largest pixel property value and said smallest pixel property value.

21. The compressor according to claim 15, further comprising:
- a difference calculator for i) calculating a first difference between a bit length of a first candidate compressed block and said target bit length and ii) calculating a second difference between a bit length of a second candidate compressed block and said target bit length, said bit length of said first candidate compressed block is equal or shorter than said target bit length, said bit length of said second candidate compressed block exceeds said target bit length and a quantization level of said second candidate compressed block that is lower than a quantization level of said first candidate compressed block;

a pixel identifier for identifying, if said first difference exceeds a first threshold value and said second difference is equal to or smaller than a second threshold value, at least one pixel of said multiple pixels;

a value modifier modifying the quantized property value of said at least one pixel identified by said pixel identifier, wherein said lossless compressor is arranged for losslessly compressing said quantized pixel property values of said multiple pixels following said property value modification to get a third candidate compressed block having a bit length that is equal to or lower than said target bit length; and a parameter estimator for estimating a respective quality parameter for said first candidate compressed block and said third candidate compressed block, wherein said representation provider is arranged for selecting said compressed representation of said block to be one of said first candidate compressed block and said third candidate compressed block based on said estimated quality parameters.

22. A decompressor for decompressing a compressed pixel block, said decompressor comprising:

a first sequence identifier for identifying a first bit sequence of said compressed pixel block corresponding to an encoded representation of pixel property values of multiple pixels in a pixel block;

a decoder for decoding said first bit sequence to get a decoded representation of a pixel property value of at least one pixel;

a second sequence identifier for identifying a second bit sequence of said compressed pixel block corresponding to an identifier of said quantization parameter;

a representation provider adapted to operate if said quantization parameter indicates that said compressed pixel block has been losslessly compressed and arranged for providing a representation of a pixel property value of said at least one pixel based on said decoded representation of said pixel property value; and a representation determiner adapted to operate if said quantization parameter indicates that said compressed pixel block has been lossy quantized during compression of said pixel block and arranged for determining said representation of said pixel property value of said at least one pixel based on said decoded representation of said pixel property value and said quantization parameter.

23. The decompressor according to claim 22, wherein said representation determiner comprises a pattern shifter for shifting a bit pattern of said decoded representation of said pixel property value s steps to the left to get said representation of said pixel property value, where s represents said quantization parameter.

24. The decompressor according to claim 22, wherein said representation determiner comprises a multiplier for multiplying said decoded representation of said pixel property value with said quantization parameter to get said representation of said pixel property value.

25. The decompressor according to claim 22, wherein said representation determiner comprises:

a value provider for providing, based on said identifier, a minimum pixel property value and a maximum pixel property value of said pixel block;

a value calculator for calculating multiple pixel property values as different linear combinations of said largest pixel property value and said smallest pixel property value; and a representation identifier for identifying said representation of said pixel property value among said smallest pixel property value, said largest pixel property value and said calculated multiple pixel property values based on said decoded representation of said pixel property value.

26. The decompressor according to claim 22, wherein said decoder comprises:

an error determiner for determining, for said at least one pixel, a prediction error based on an encoded error representation associated with said at least one pixel and comprised in said first bit sequence;

a prediction provider for providing a prediction of said decoded representation of said pixel property value, said prediction provider comprising:

a prediction calculator for calculating said prediction based on a first weighted combination of a pixel property value of a first neighboring pixel in said block and a pixel property value of a second neighboring pixel in said block employing non-zero weights if a magnitude difference between said pixel property values of said neighboring pixels is smaller than a threshold; and a prediction selector for selecting, if said magnitude difference is not smaller than said threshold, said prediction to be based on one of a second different, weighted combination of said pixel property values of said neighboring pixels and a third different, weighted combination of said pixel property values of said neighboring pixels based on a guiding bit associated with said at least one pixel and comprised in said first bit sequence; and a representation calculator for calculating said decoded representation of said pixel property value based on said prediction error and said prediction.

* * * * *

UNITED STATES PATENT AND TRADEMARK OFFICE
CERTIFICATE OF CORRECTION

PATENT NO. : 8,335,385 B2
APPLICATION NO. : 12/863692
DATED : December 18, 2012
INVENTOR(S) : Ström et al.

It is certified that error appears in the above-identified patent and that said Letters Patent is hereby corrected as shown below:

On the Title Page

Item (12), under "United States Patent", in Column 1, Line 1, delete "Strom" and insert -- Ström --, therefor.

Item (75), under "Inventors", in Column 1, Line 1, delete "Strom," and insert -- Ström, --, therefor.

Item (75), under "Inventors", in Column 1, Line 2, delete "Akenine-Moller," and insert -- Akenine-Möller, --, therefor.

Item (75), under "Inventors", in Column 1, Line 3, delete "Arsta" and insert -- Årsta --, therefor.

Item (56), under "OTHER PUBLICATIONS", in Column 2, Line 1, delete "Unknown." and insert -- Unknown, --, therefor.

Item (56), under "OTHER PUBLICATIONS", in Column 2, Line 1, delete "OpenEXR."" and insert -- OpenEXR," --, therefor.

In the Specification

In Column 4, Line 18, delete "a R" and insert -- an R --, therefor.

In Column 4, Line 44, delete "number. the" and insert -- number, the --, therefor.

In Column 5, Line 39, delete "Tt arg et" and insert -- Ttarget --, therefor at each occurrence throughout the specification.

In Column 10, Line 32, delete "wi(j 1)1Ri(j-1)," and insert -- wi(j-1)1Ri(j-1), --, therefor.

Signed and Sealed this
Twenty-second Day of July, 2014

Michelle K. Lee
*Deputy Director of the United States Patent and Trademark Office*

CERTIFICATE OF CORRECTION (continued)
U.S. Pat. No. 8,335,385 B2

In Column 10, Line 48, delete "And" and insert -- An --, therefor.

In Column 13, Line 16, delete "otherwise" and insert -- otherwise. --, therefor.

In Column 15, Line 15, delete "and……such as" and insert the same at Line 14, after "maximum" as a continuation.

In Column 16, Line 25, delete "1bin" and insert -- 1bin. --, therefor.

In Column 25, Line 33, delete "(preferably" and insert -- preferably --, therefor.